United States Patent [19]

Nakano et al.

[11] Patent Number: 5,448,043
[45] Date of Patent: Sep. 5, 1995

[54] FOREIGN REMITTANCE TRANSACTION TERMINAL APPARATUS AND FOREIGN REMITTANCE TRANSACTION SYSTEM EMPLOYING THE SAME

[75] Inventors: Satoshi Nakano; Yoshiharu Morohashi, both of Kawasaki, Japan

[73] Assignee: Fujitsu Limited, Kawasaki, Japan

[21] Appl. No.: 134,823

[22] Filed: Oct. 12, 1993

[30] Foreign Application Priority Data

Feb. 19, 1993 [JP] Japan .................................. 5-054976

[51] Int. Cl.⁶ ........................ G06F 15/30; G06K 5/00
[52] U.S. Cl. ..................................... 235/379; 235/380
[58] Field of Search ................ 235/379, 380, 375, 381; 364/408

[56] References Cited

U.S. PATENT DOCUMENTS

| | | | |
|---|---|---|---|
| 4,417,136 | 11/1983 | Rushby | 235/379 |
| 4,833,312 | 5/1989 | Minematsu | 235/379 |
| 4,953,086 | 8/1990 | Fukatsu | 364/408 |

*Primary Examiner*—Donald Hajec
*Assistant Examiner*—Karl D. Frech
*Attorney, Agent, or Firm*—Staas & Halsey

[57] ABSTRACT

Foreign remittance transaction terminal apparatus for sending money to foreign countries, which includes lobby terminal equipment operated by a user, and counter terminal equipment operated by a teller and connected to a host computer. The lobby terminal equipment has a unit for the user inputting at least a beneficiary, a remittance currency, and an amount of remittance as items required for application for the foreign remittance, a unit for displaying an operation guidance screen for guidance for the user about items to be input for application for the foreign remittance, and a unit for outputting the items input through the input unit onto an output medium and for issuing it to the user. The counter terminal equipment has a unit for inputting the contents of the output medium received from the user, and a unit for transmitting the remittance data based on the input contents to the host computer. Also disclosed is a foreign remittance transaction system including lobby terminal equipment arranged as described above, counter terminal equipment also arranged as described above, and a computer connected to the counter terminal equipment to check the remittance data transmitted and to transmit the result of the check to the counter terminal equipment.

21 Claims, 63 Drawing Sheets

FIG. 2
PRIOR ART

| TO: (THE BANK) | (APPLICATION FOR REMITTANCE)(D) | DATE |
|---|---|---|

| (KIND OF REMITTANCE) | (SETTLEMENT METHOD) |
|---|---|

(651)

| (METHOD OF PAYMENT) (ADVICE & PAY) | (PAYING BANKS CHARGES) |
|---|---|

OUR REF - TTS -

(BENEFICIARY'S NAME)

(AMOUNT)

(BENEFICIARY'S ADDRESS IF NO A/C NO.)

((EQUIVALENT AMOUNT))

(BENEFICIARY'S A/C NO.)

(BENEFICIARY'S COUNTRY)

| CUR-RENCY | DEPOSIT |
| | REMITTANCE |
| | CHANGE |

(BENEFICIARY'S BANK & BRANCH OR ADDRESS)

(SENDERS NAME)

CASHIER STAMP (MESSAGE TO BENEFICIARY)

(PURPOSE OF REMITTANCE)

(PERMIT NO.)   (DATE)

THESE SECTIONS MUST BE FILLED IN (WE REQUEST THE ABOVE REMITTANCE UNDER THE TERMS AND CONDITIONS SET FORTH ON THE BACK HEREOF)
(ADDRESS)

(SIGNATURE)   (TEL)

| REMITTANCE DATE | NUMBER OF REMITTANCES |
|---|---|

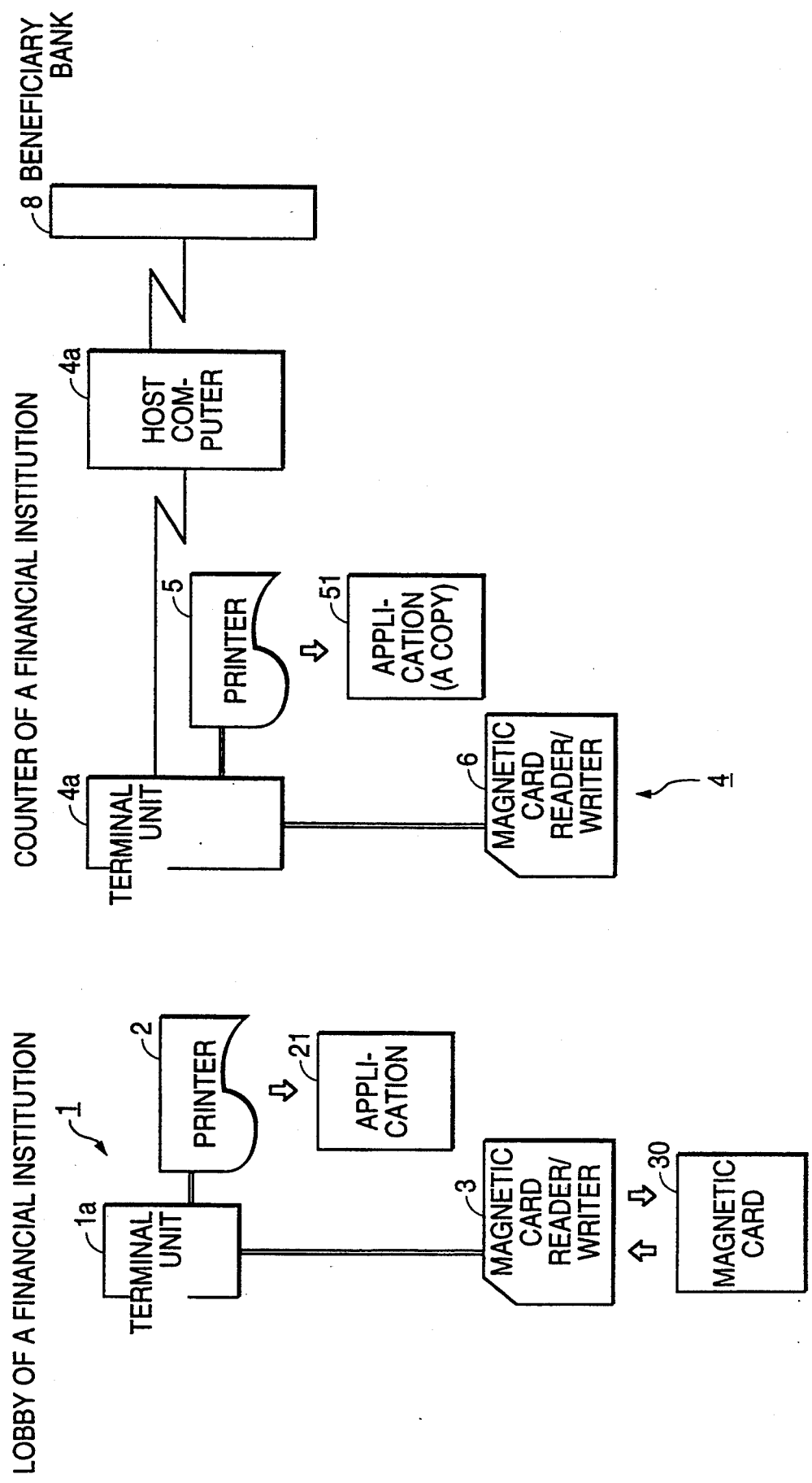

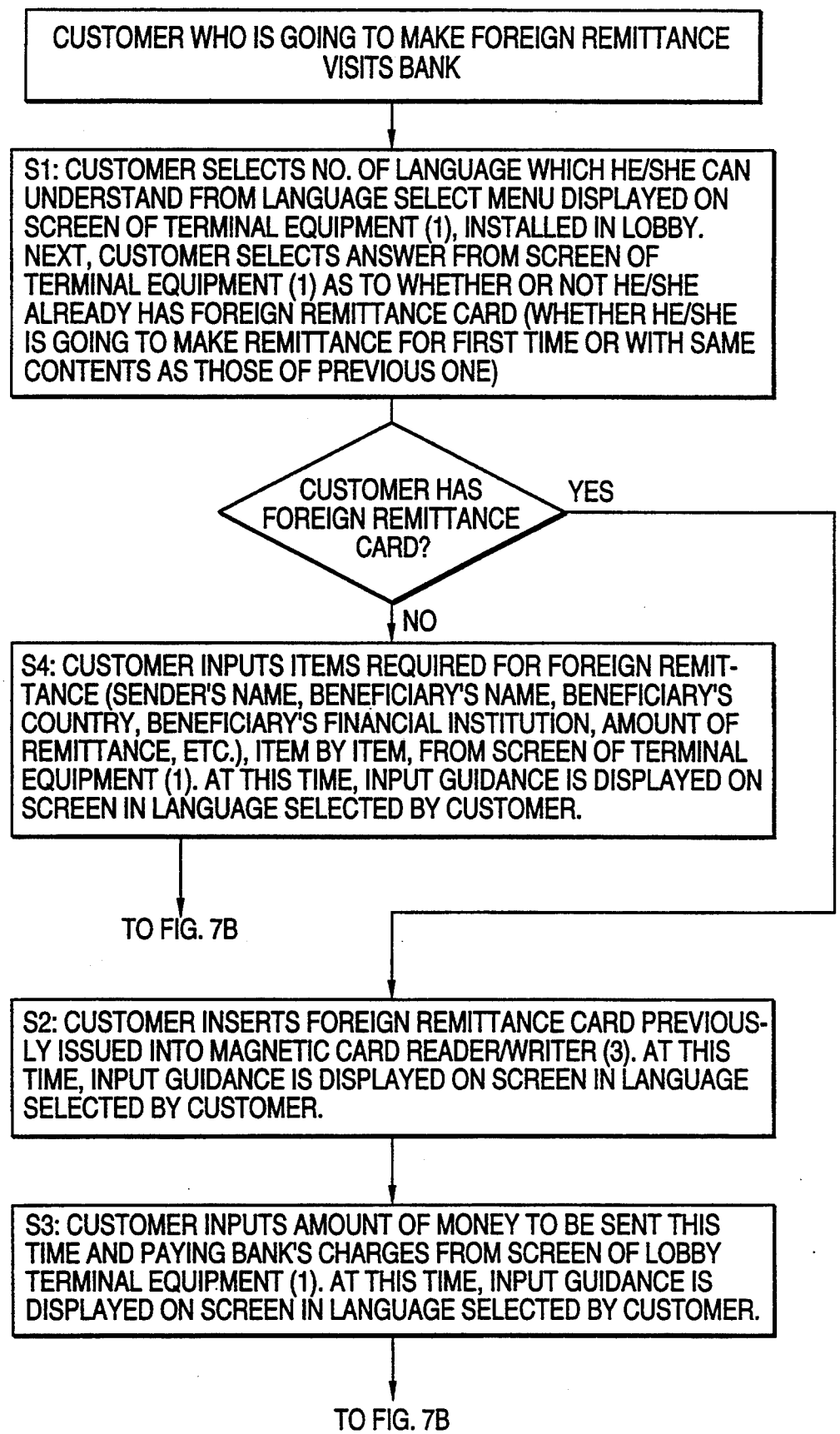

FIG. 7B

FROM FIG. 7A
↓

S5: ITEMS INPUT TO TERMINAL EQUIPMENT (1) ARE PRINTED ON APPLICATION FORM BY PRINTER (2) CONNECTED TO TERMINAL EQUIPMENT (1).

↓

S6: ITEMS INPUT TO TERMINAL EQUIPMENT (1) ARE OUTPUT ONTO FOREIGN REMITTANCE CARD BY MAGNETIC CARD READER/WRITER (3) CONNECTED TO TERMINAL EQUIPMENT (1).

↓

S7: CUSTOMER WRITES MESSAGE, PURPOSE, PERMIT NO., DATE, ADDRESS, SIGNATURE, AND TELEPHONE NO. ON APPLICATION FORM.

↓
TO FIG. 7C

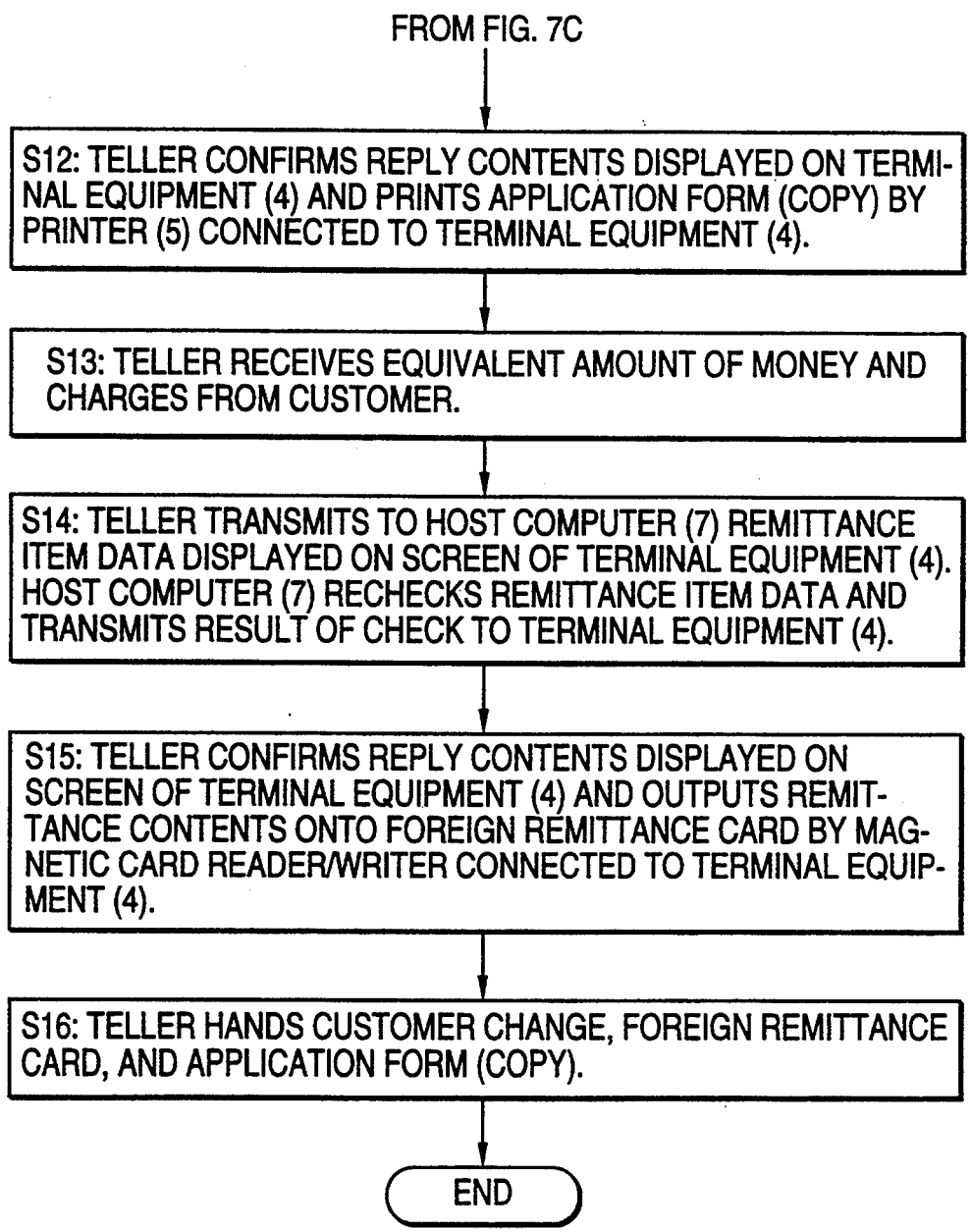

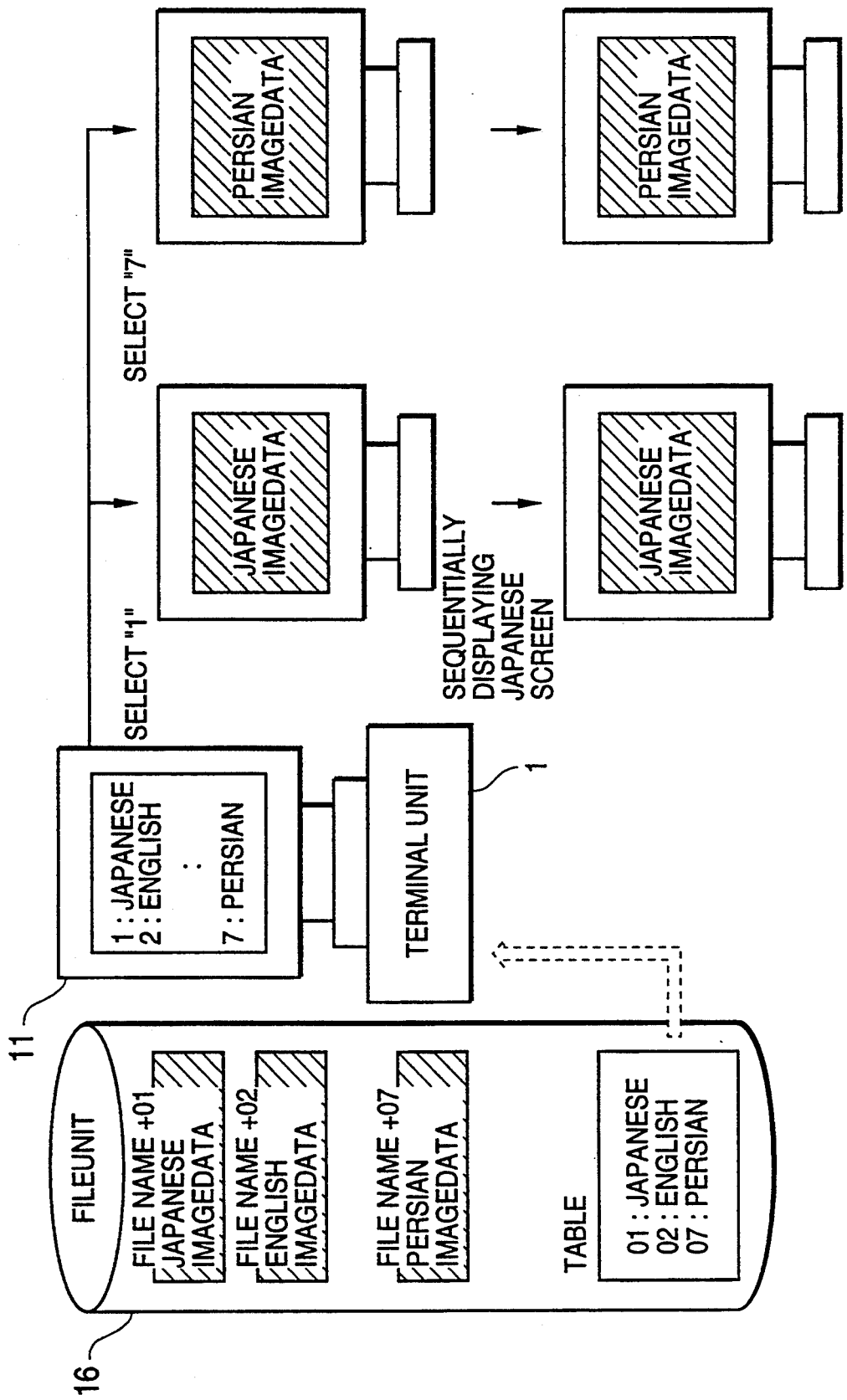

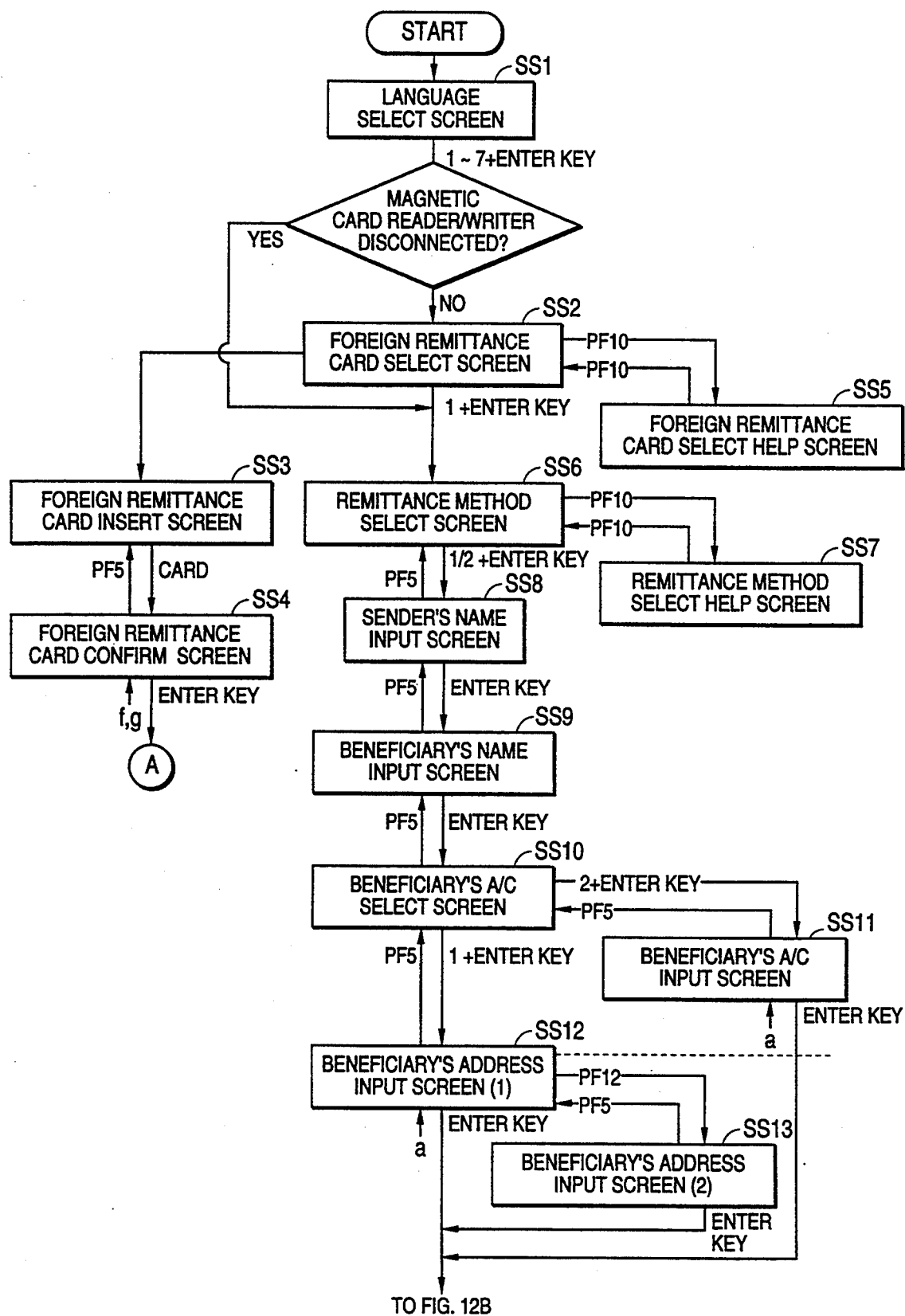

FIG. 13

DO YOU HAVE A FOREIGN REMITTANCE CARD?

YES ⇨ [1] [ENTER]

NO ⇨ [2] [ENTER]

THE TRANSACTION DETAILS ARE AS FOLLOWS.

THE DETAILS ARE CORRECT.  ⇦ ENTER

I WISH TO USE ANOTHER CARD.  ⇦ PF5

I WISH TO MAKE A NEW CARD.  ⇦ PF1

| | | |
|---|---|---|
| SENDER'S NAME | : | TOM JOHNSON |
| BENEFICIARY'S NAME | : | MARY JOHNSON |
| BENEFICIARY'S COUNTRY | : | INDONESIA |
| REMITTANCE CURRENCY | : | US$ |
| BENEFICIARY'S BANK | : | BANK BUMI DAYA |

FIG. 16

WHAT IS FOREIGN REMITTANCE CARD?

IT IS A CARD ON WHICH ALL DETAILS OF YOUR REMITTANCE ARE STORED. IF YOU WISH TO MAKE THE SAME REMITTANCE IN FUTURE, THE CARD WILL NOT ONLY SAVE YOU TIME, BUT ENTITLES YOU TO A DISCOUNT IN THE CHARGES PAYABLE.

AFTER FOLLOWING THE INSTRUCTIONS ON ALL SCREENS, YOU WILL BE ISSUED A FOREIGN REMITTANCE CARD AND A COMPLETED APPLICATION FORM WHICH SHOULD BE USED TO MAKE YOUR FOREIGN REMITTANCE.

RETURN TO PREVIOUS SCREEN ⟶ (PF10)

FIG. 18

WHAT IS TELEGRAPHIC TRANSFER?

IT IS THE METHOD WHEREBY THE PAYMENT INSTRUCTION IS SENT TO THE BENEFICIARY'S BANK BY TELEGRAM.
TELEGRAPHIC TRANSFER IS FASTER THAN ORDINARY TRANSFER. TELEGRAPHIC TRANSFER IS STRONGLY RECOMMENDED AS THE SAFER ALTERNATIVE.

WHAT IS ORDINARY TRANSFER?

IT IS THE METHOD WHEREBY THE PAYMENT INSTRUCTION IS SENT TO THE BENEFICIARY'S BANK BY AIR MAIL ETC.
ORDINARY TRANSFER REQUIRES MORE DAYS THAN TELEGRAPHIC TRANSFER TO REACH THE BENEFICIARY'S BANK.

RETURN TO PREVIOUS SCREEN ⟶ (PF10)

FIG. 19

PLEASE INPUT THE SENDER'S NAME USING THE ALPHABET.

EXAMPLE : ⇨ TOM JOHNSON

IF DETAILS ARE CORRECT, PUSH [ENTER] KEY.

FIG. 20

PLEASE INPUT THE BENEFICIARY'S NAME USING THE ALPHABET.

EXAMPLE : ⇨ MARY JOHNSON

IF DETAILS ARE CORRECT, PUSH (ENTER) KEY.

FIG. 22

PLEASE INPUT THE BENEFICIARY'S ACCOUNT NUMBER.

EXAMPLE: ⇨ 1 2 3 4 5 6 7 8

IF DETAILS ARE CORRECT, PUSH [ENTER] KEY.

FIG. 23

PLEASE INPUT THE ADDRESS (INCLUDING COUNTRY'S NAME) OF THE BENEFICIARY USING THE ALPHABET.

EXAMPLE : ⇨ 01 SHELL EAST BROADWAY NY 1 9 8 2 0 2 , U. S. A.

IF DETAILS ARE CORRECT, PUSH [ENTER] KEY.

IF MORE SPACE IS NEEDED, CONTINUE TO NEXT SCREEN.

CONTINUE TO NEXT SCREEN ⟶ [PF12]

FIG. 24

PLEASE INPUT THE REST OF THE ADDRESS (INCLUDING COUNTRY'S NAME) USING THE ALPHABET.

EXAMPLE: ⇨ BROADWAY NY 198202, U.S.A.

IF DETAILS ARE CORRECT, PUSH [ENTER] KEY.

RETURN TO PREVIOUS SCREEN ⟶ [PF 5]

FIG. 25

PLEASE CHOOSE THE BENEFICIARY'S COUNTRY FROM THE LIST BELOW. (LIST IS CONTINUED ON THE NEXT SCREEN.)

EXAMPLE: U.S.A.    ⇨  [ 2 ] [ENTER]

CONTINUE TO NEXT SCREEN ⟶ [PF12]

| 1 | MALAYSIA | 5 | U.K. | 9 | CANADA |
|---|---|---|---|---|---|
| 2 | U.S.A. | 6 | PHILIPPINES | 10 | BANGLADESH |
| 3 | THAILAND | 7 | COLUMBIA | 11 | FRANCE |
| 4 | IRAN | 8 | P. R. OF CHINA | 12 | SINGAPORE |

FIG. 26

PLEASE CHOOSE THE BENEFICIARY'S COUNTRY FROM THE LIST BELOW.

EXAMPLE : AUSTRALIA  ⇧  ① ③ [ENTER]

YOU CANNOT FIND THE COUNTRY.  ⇧  ② ④ [ENTER]

| 13 | AUSTRALIA | 17 | HONG KONG | 21 | SWITZERLAND |
| 14 | INDONESIA | 18 | ITALY | 22 | MYANMAR |
| 15 | GERMANY | 19 | GHANA | 23 | TAIWAN |
| 16 | KOREA | 20 | SRI LANKA | 24 | OTHER |

FIG. 27

PLEASE CHOOSE THE NAME OF THE BANK TO WHICH YOU ARE GOING TO SEND MONEY FROM THE LIST BELOW.

EXAMPLE : BANK OF TOKYO ⇨ [ 1 ] [ENTER]

YOU CANNOT FIND THE NAME OF THE BANK ⇨ [ 8 ] [ENTER]

| 1 | BANK OF TOKYO (DEUTSCHELAND) | 5 | BAYERISCHE VEREINSBANK |
|---|---|---|---|
| 2 | DEUTSCHE BANK | 6 | BERLINER BANK |
| 3 | COMMERZBANK | 7 | DG BANK DEUTSCHE |
| 4 | DRESDNER BANK | 8 | OTHER |

FIG. 28

PLEASE CHOOSE THE BRANCH NAME OF THE BANK TO WHICH YOU ARE GOING TO SEND MONEY FROM THE LIST BELOW.

EXAMPLE : HEAD OFFICE    ⇨   [ 1 ] (ENTER)

CONTINUE TO NEXT SCREEN ⟶ (PF12)

| | |
|---|---|
| 1 | FRANKFURT |
| 2 | DÜSSELDORF |
| 3 | KÖLN |
| 4 | HAMBERG |
| 5 | MÜNICHEN |

FIG. 29

PLEASE CHOOSE THE BRANCH NAME OF THE BANK TO WHICH YOU ARE GOING TO SEND MONEY FROM THE LIST BELOW.  ⇨ [1] [0] [ENTER]

YOU CANNOT FIND THE BRANCH NAME OF THE BANK.

RETURN TO PREVIOUS SCREEN ⟶ [PF 5]

| 6 | HANNOVER |
|---|---|
| 7 | ESSEN |
| 8 | HEIDELBERG |
| 9 | NURNBERG |
| 10 | OTHER |

FIG. 30

PLEASE INPUT THE NAME OF BENEFICIARY'S COUNTRY
USING THE ALPHABET.

EXAMPLE : ⇨ BRAZIL

IF DETAILS ARE CORRECT, PUSH [ENTER] KEY.

FIG. 31

PLEASE INPUT THE NAME OF THE BANK TO WHICH YOU ARE GOING TO SEND MONEY.

EXAMPLE: ⇨ BANK OF TOKYO

IF DETAILS ARE CORRECT, PUSH [ENTER] KEY.

ATTENTION!: DO NOT INPUT THE NAME OF THE BRANCH.

FIG. 32

PLEASE INPUT THE BRANCH NAME OF THE BANK TO WHICH YOU ARE GOING TO SEND MONEY.

EXAMPLE : ⇨ HEAD OFFICE

IF DETAILS ARE CORRECT, PUSH [ENTER] KEY.

ATTENTION! : DO NOT INPUT THE NAME OF THE BANK.

FIG. 33

THE BENEFICIARY'S BANK AND/OR THE TRANSFERRING BANK
CHARGES, IF ANY, ARE FOR ACCOUNT OF:

BENEFICIARY PAYS ⇨ [1] [ENTER]

SENDER PAYS ⇨ [2] [ENTER]

USUALLY TO BE PAID BY THE BENEFICIARY.

WHAT ARE THESE CHARGES?

THESE CHARGES ARE CLAIMED BY THE BENEFICIARY'S BANK AND/OR THE TRANSFERRING BANK AFTER THE PAYMENT INSTRUCTION IS DISPATCHED FROM JAPAN.

USUALLY TO BE PAID BY THE BENEFICIARY.

RETURN TO PREVIOUS SCREEN ⟶ (PF10)

FIG. 35

PLEASE CHOOSE THE CURRENCY OF MONEY THAT YOU ARE GOING TO SEND FROM THE LIST BELOW. (LIST CONTINUED ON NEXT SCREEN.)

EXAMPLE : YEN ⇨ [ 1 ] [ENTER]

CONTINUE TO NEXT SCREEN ⟶ [PF12]

| 1 | YEN | JAPANESE YEN | 7 | CAN $ | CANADIAN DOLLAR |
|---|---|---|---|---|---|
| 2 | US $ | US DOLLAR | 8 | F.FR | FRENCH FRANC |
| 3 | RINGIT | MALASIAN RINGIT | 9 | S $ | SINGAPORE DOLLAR |
| 4 | BAHT | THAI BAHT | 10 | $ A | AUSTRAILIAN DOLLAR |
| 5 | STG£ | STERLING POUND | 11 | RUPIAH | INDONESIAN RUPIAH |
| 6 | RMB | YUAN REMINBI | 12 | DM | DEUTSCHE MARK |

FIG. 36

PLEASE CHOOSE THE CURRENCY OF MONEY THAT YOU ARE GOING TO SEND FROM THE LIST BELOW. (LIST CONTINUED ON NEXT SCREEN.)

EXAMPLE : H K $  →  [1] [3] (ENTER)   CONTINUE TO NEXT SCREEN → (PF12)

| 13 | HK $ | HONGKONG DOLLAR | 19 | PTAS C | SPANISH PESETA |
|---|---|---|---|---|---|
| 14 | LIT | ITALIAN LIRA | 20 | P. ESC | PORTUGUESE ESCUDO |
| 15 | S. FR | SWISS FRANC | 21 | S. KR | SWEDISH KRONE |
| 16 | NZ $ | NEW ZEALAND DOLLAR | 22 | D. KR | DANISH KRONE |
| 17 | N. GLD | NETHERLAND GUILDER | 23 | N. KR | NORWEGIEN KRONE |
| 18 | B. FR | BELGIAN FRANC | 24 | MARKKA | FINLAND MARKKA |

FIG. 37

PLEASE CHOOSE THE CURRENCY OF MONEY THAT YOU ARE GOING TO SEND FROM THE LIST BELOW.

YOU CANNOT FIND THE CURRENCY THAT YOU WANT TO SEND.

⇨ [ 3 ] [ 4 ] (ENTER)

| 25 | A. SCH | AUSTRIAN SCHILLING | 31 | UAE. DHM | U. A. E. DIRHAM |
| 26 | IND. RP | INDIAN RUPEE | 32 | Q. RYAL | QATAR RIYAL |
| 27 | P. RP | PAKISTAN RUPEE | 33 | ECU | EUROPEAN CURRENCY UNIT |
| 28 | MEX. P | MEXICAN PESO | 34 | OTHER | |
| 29 | K. DNR | KUWAIT DINAR | 35 | | |
| 30 | S. RYAL | SAUDI RIYAL | 36 | | |

FIG. 38

PLEASE INPUT THE AMOUNT YOU WANT TO SEND, CHECKING THAT THE DECIMAL POINT IS IN THE RIGHT PLACE.

⇨ AMOUNT [ENTER]

EXAMPLE : US$, M$, DM ETC.  ⇨  1 2 3 4 5 6 . 7 8  [ENTER]

EXAMPLE : YEN, B.FR, LIT ETC,  ⇨  1 2 3 4 5 6 7 8  [ENTER]

EXAMPLE : KUWAIT DINAR  ⇨  1 2 3 4 5 . 6 7 8  [ENTER]

FIG. 39

PLEASE CHOOSE THE CURRENCY THAT YOU WANT TO PAY AT THE FOREIGN REMITTANCE COUNTER.

YEN  ⇨  [ 1 ]  (ENTER)

DM   ⇨  [ 2 ]  (ENTER)

FIG. 40

IS THE AMOUNT FIXED IN THE CURRENCY YOU CHOOSE?

YES ⇨ [1] [ENTER]　　NO ⇨ [2] [ENTER]

EXAMPLE : I WANT TO SEND US$10,000.00. ⇨ [1] [ENTER]

EXAMPLE : I WANT TO SEND US$ EQUIVALENT OF 100,000 YEN. ⇨ [2] [ENTER]

ATTENTION ! : IF YOU CHOOSE [2] , YOU WILL HAVE TO MAKE PAYMENT IN JAPANESE YEN AT THE FOREIGN REMITTANCE COUNTER.

FIG. 41

PLEASE INPUT THE EQUIVALENT AMOUNT YOU WISH TO SEND IN JAPANESE YEN.

EXAMPLE : EQUIVALENT OF 300, 000 YEN ⇨ 300000

IF DETAILS ARE CORRECT, PUSH [ENTER] KEY.

FIG. 42

WOULD YOU LIKE TO PAY THE CHARGES THAT THE BANK OF TOKYO CLAIMS SEPARATELY FROM THE AMOUNT YOU INPUT IN THE PREVIOUS SCREEN?

YES ⇨ [ 1 ] [ENTER]

NO ⇨ [ 2 ] [ENTER]

ATTENTION !: IF YOU CHOOSE [ 2 ], THE AMOUNT THE BENEFICIARY RECEIVES IS THAT OF THE EQUIVALENT AMOUNT, BUT MINUS THE CHARGES.

FIG.43

PLEASE CHECK ALL THE DETAILS INPUT ON THE NEXT THREE SCREENS.

SOME ITEMS ARE NOT CORRECT. ⇨ [ITEM NO.] [ENTER]

CONTINUE TO NEXT SCREEN ⇨ [ENTER]

| ITEM NO. | | | |
|---|---|---|---|
| 1 | METHOD OF REMITTANCE | ⇨ | TELEGRAPHIC TRANSFER |
| 2 | SENDER'S NAME | ⇨ | TARO TOGIN |
| 3 | BENEFICIARY'S NAME | ⇨ | HANAKO TOGIN |
| 4 | BENEFICIARY'S ADDRESS | ⇨ | NORTHGATE HOUSE, 201204 MOORGATE LONDON EC2R 6DH |
| 5 | BENEFICIARY'S A/C NO. | ⇨ | 1 2 3 4 5 6 7 8 |

FIG. 44A

PLEASE CHECK ALL THE DETAILS INPUT ON THE NEXT TWO SCREENS.

SOME ITEMS ARE NOT CORRECT. ⇨ [ITEM NO.] [ENTER]

CONTINUE TO NEXT SCREEN ⇨ [ENTER]

| ITEM NO. | | |
|---|---|---|
| [6] | BENEFICIARY'S COUNTRY | ⇨ INDONESIA |
| [7] | BENEFICIARY'S BANK | ⇨ BANK BUMI DAYA |
| [8] | BRANCH | ⇨ UJANG PANDANG (MAKASSAR) BRANCH |
| [9] | CHARGES | ⇨ BENEFICIARY PAYS |
| [10] | REMITTANCE CURRENCY | ⇨ U S $ |

PREVIOUS SCREEN ⇨ [PF 5]

FIG. 44B

PLEASE CHECK ALL THE DETAILS INPUT ON THIS SCREEN.

SOME ITEMS ARE NOT CORRECT. ⇨ [ITEM NO.] [ENTER]

ALL ITEMS ON THESE SCREENS ARE CORRECT. ⇨ [ENTER]

[ITEM NO.]

- [11] REMITTANCE AMOUNT ⇧
- [12] PAY BY ⇧
- [13] EQUIVALENT AMOUNT (YEN) ⇧ 1000000
- [14] EQUIVALENT AMOUNT CHARGES IN ⇧ CHARGES INCLUDED

PREVIOUS SCREEN ⇨ [PF 5]

PLEASE WAIT!

YOUR CARD IS NOW BEING PROCESSED.

PLEASE WAIT !
YOUR APPLICATION FORM IS NOW BEING PRINTED.

PLEASE TAKE YOUR CARD TO THE FOREIGN REMITTANCE COUNTER.

FOREIGN REMITTANCE COUNTER

CARD

*FIG. 50*

THANK YOU FOR YOUR PATRONAGE.

WE LOOK FORWARD TO YOUR NEXT VISIT AND HOPE THAT

YOU HAVE A NICE DAY.

FIG. 53

```
RQNO.330??              —CARD REMITTANCE SERVICE—
PROCESS SECTION  <PRIOR DATE YY.MM.DD.   NO. OF REMIT_____ TRANSACTION BRANCH_>
BS NO.        APPLICANT ooooooo     TT OR OT XX    TELEGRAM CLASS o
CURRENCY ooo    AMOUNT  oooooooooooo    COST FIX (o) oooooooooooo
INCLUDING CHARGE o RESERVE oooo   RATE DESIGNATE o  SP ooooo   PRIOR RATE o
SETTLEMENT DRAW oooooo-ooo   CASH BOX ooo   CHECK NO. ooooo   CWF/RWF o
CHARGE DRAW      oooooo-ooo   CASH BOX ooo   CHECK NO. ooooo   CWF/RWF o
CHARGE COLLECTION o  REMIT oooo    CABLE oooo       CORR/TRNS o(oooo)
NY. CHG oooo     LIFT o(ooooooo)     THEIR CHG BY o   AMOUNT OF CHARGE _____
EXCHANGE RATE ____ AMOUNT OF YEN _____   TOTAL AMOUNT _____
SENDER  ooooooooooooooooooooooooooo-ooooooooooooooooooooooooooooo
BENEFICIARY NAME  ooooooooooooooooooooo
       (A/C NO.  oooooooooooooooooooooooooooo )
       ADDRESS  ooooooooooooooooooooooooooo-oooooooooooooooooooooooooooooo
              ooooooooooooooooooooooooooooo  COUNTRY NAME  oooooooooo ooooo
PAYING BANK oooooooooooooooooooooooo  oooooooooooooooooooooooooooo
A/C WITH BANK o        NAME  oooooooooooooooooooooooooo
BR NAME ____ ooooooooooooooooooooooooooo  oooooooooooooooooooooooooo
/ ADDRESS ____ ooooooooooooooooooooooooo
THRU BANK   ooooooo
MSG         oooooooooooooooooooooooooooooooooooo-ooooooooooooooooooooooo
INF         oooooooooooooooooooooooooooooooooooo-ooooooooooooooooooooooo
48700953
          91.09.24 - 10:50
```

FIG. 54
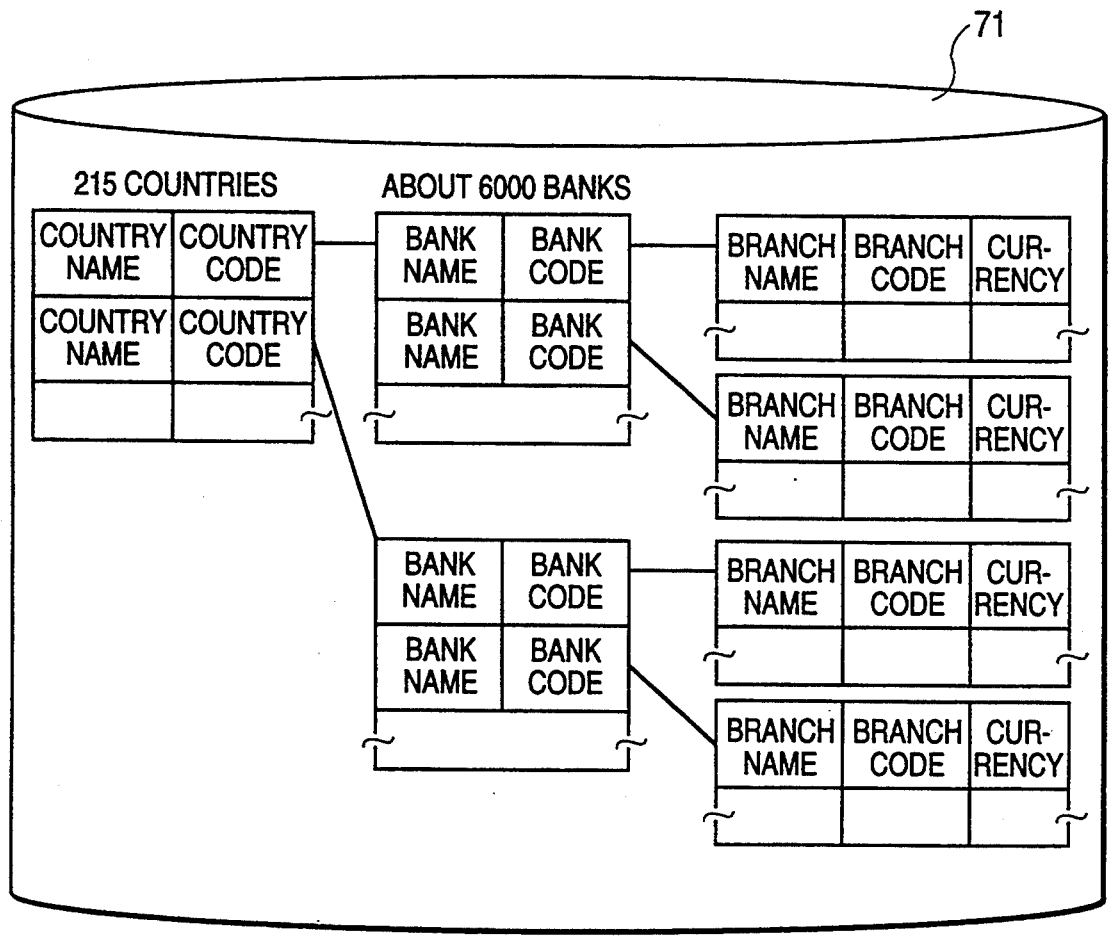
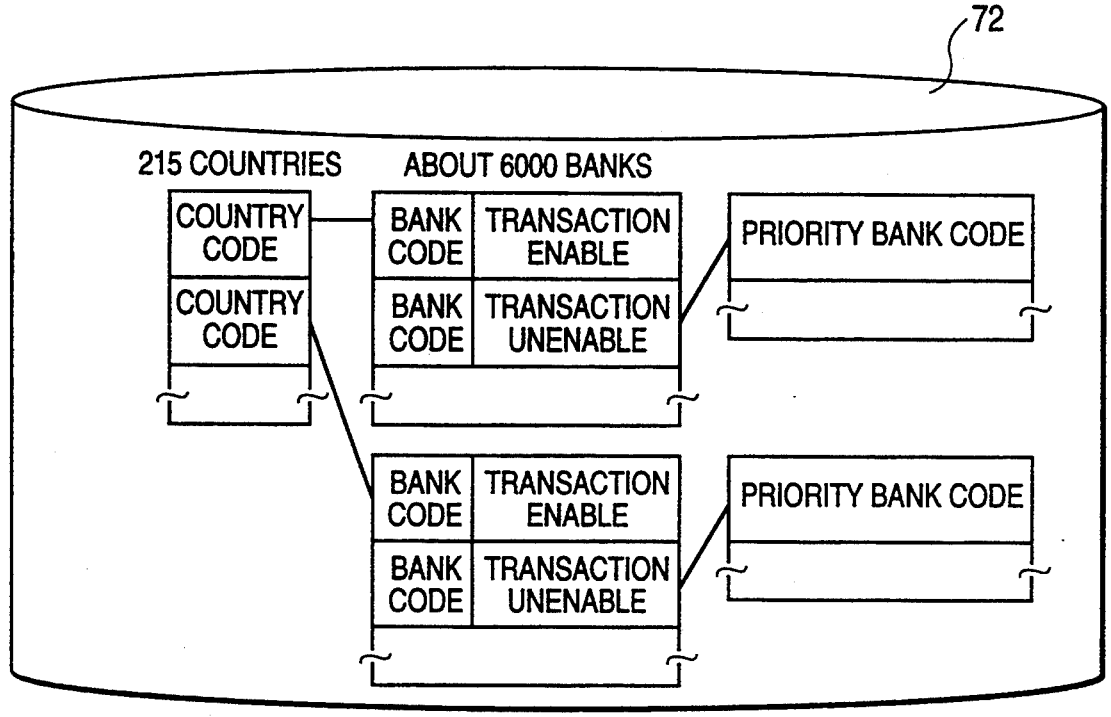

FOREIGN REMITTANCE TRANSACTION TERMINAL APPARATUS AND FOREIGN REMITTANCE TRANSACTION SYSTEM EMPLOYING THE SAME

BACKGROUND OF THE INVENTION

1. Field of the Invention

The present invention relates to foreign remittance transaction terminal apparatus used for conducting foreign remittance business and also to a foreign remittance transaction system employing the foreign remittance transaction terminal apparatus. More particularly, the present invention relates to foreign remittance transaction terminal apparatus capable of automatically preparing an application form for remittance required to apply to a financial institution for foreign remittance. The present invention also relates to a foreign remittance transaction system employing the foreign remittance transaction terminal apparatus.

2. Description of the Related Art

With the recent internationalization of societies, the number of applications for foreign remittance made per year has reached several hundreds of thousands. Since sending of money to foreign countries can be performed only by financial institutions qualified to transact foreign remittance business, there has been a demand for a system capable of efficiently transacting foreign remittances increasing in number.

FIG. 1 shows the arrangement of a conventional foreign remittance transaction system, and FIG. 2 illustrates an application form for foreign remittance. Hitherto, a customer who applies to a financial institution for foreign remittance fills out an application form for foreign remittance as shown in FIG. 2 using the alphabet and hands a teller the money to be sent, together with the application form. As shown in FIG. 2, the application form for foreign remittance has about 20 entries, starting with "KIND OF REMITTANCE". That is, the application form for foreign remittance has, in addition to 12 entries common to domestic and foreign remittances, such entries as "KIND OF REMITTANCE", "SETTLEMENT METHOD", "PAYING BANKS CHARGES", "BENEFICIARYS COUNTRY", "PURPOSE", etc. Thus, the number of entries is approximately double the number of entries to be made for domestic remittance.

The application form for foreign remittance filled out by the sender is then checked by a teller for the presence of an error in the contents. For example, it is checked whether or not the designated branch of the beneficiary's bank actually exists, whether or not the designated currency in which the remittance is to be made can be accepted by the branch of the beneficiary's bank, and whether or not it is possible to make remittance in the amount and currency as requested to the beneficiary's country. Then, the teller calculates remittance charges from basic charges, predetermined charges for the amount of remittance, and exchange charges according to the kind of currency.

Thereafter, as shown in FIG. 1, the teller inputs the remittance data written on the application form by counter terminal equipment 100 and transmits it to a host computer 101. The host computer 101 transmits the remittance data to a beneficiary's bank 102 designated by the remittance data, thereby transacting foreign remittance.

In many cases of such foreign remittance, the customer usually sends money to the same beneficiary every 1 to 3 months. With the prior art, when the sender applies for foreign remittance again to the same beneficiary, he or she must fill out an application form for foreign remittance with the same items as those of the application form for the remittance previously made. Thus, the customer must fill out an application form with the same contents every time foreign remittance is to be made, and hence the teller inevitably needs a great deal of time to guide the customer in his/her writing remittance items on an application form and to check them. In particular, an application form for foreign remittance has a number of entries double that of an application form for domestic remittance, and hence a great deal of time is needed to write remittance items and to check them.

In addition, since many of senders are foreigners, application forms themselves must be made understandable in many languages. The application form for foreign remittance as shown in FIG. 2 has thereon various items written in both Japanese and English but cannot cope with Spanish or other languages.

Furthermore, in order to transmit the remittance data written on the application form to the beneficiary's bank, it is necessary for the teller to input all the data by a manual operation, which loads him/her heavily.

Moreover, the teller must check each item on the application form filled out by the sender. This checking operation takes a great deal of time and labor. In addition, it is necessary to calculate remittance charges, which also requires a great deal of time and labor. For these reasons, tellers who can handle foreign remittance are limited to those experienced, and it is difficult to cope with the increase in the number of applications for foreign remittance.

SUMMARY OF THE INVENTION

It is an object of the present invention to provide foreign remittance transaction terminal apparatus for minimizing the time and labor required for a sender to fill out an application form for foreign remittance, and a foreign remittance transaction system employing the foreign remittance transaction terminal apparatus.

It is another object of the present invention to provide foreign remittance transaction terminal apparatus for enabling each item of an application form for foreign remittance to be readily input even in a language other than Japanese, and a foreign remittance transaction system employing the foreign remittance transaction terminal apparatus.

It is still another object of the present invention to provide foreign remittance transaction terminal apparatus for minimizing the time and labor required for a teller to input each item of an application form for foreign remittance, and a foreign remittance transaction system employing the foreign remittance transaction terminal apparatus.

It is a further object of the present invention to provide foreign remittance transaction terminal apparatus for saving a teller time and labor required to check each item of an application form for foreign remittance, and an foreign remittance transaction system employing the foreign remittance transaction terminal apparatus.

It is a still further object of the present invention to provide foreign remittance transaction terminal apparatus for saving a teller time and labor required to check an application form for foreign remittance and to calculate remittance charges, and a foreign remittance transaction system employing the foreign remittance transaction terminal apparatus.

To these ends, the present invention provides foreign remittance transaction terminal apparatus including lobby terminal equipment operated by a user, and counter terminal equipment operated by a teller and connected to a host computer. The lobby terminal equipment has a unit for the user inputting at least a beneficiary, a remittance currency, and an amount of remittance as items required for application for foreign remittance, a unit for displaying an operation guidance screen for guidance for the user about items to be input for application for the foreign remittance, and a unit for outputting the items input through the input unit onto an output medium and for issuing it to the user. The counter terminal equipment has a unit for inputting the contents of the output medium received from the user, and a unit for transmitting the remittance data based on the input contents to the host computer.

In the above-described arrangement, the foreign remittance transaction terminal apparatus is provided with lobby terminal equipment whereby the required items of an application form for foreign remittance are output on an output medium in response to the user's operation of inputting each item of the application form according to the guidance given by the display screen. Accordingly, it is possible to minimize the time and labor required for the user to prepare an application form, and each item of the application form can be input accurately.

In addition, the present invention provides a foreign remittance transaction system including lobby terminal equipment operated by a user, counter terminal equipment operated by a teller, and a computer connected to the counter terminal equipment. The lobby terminal equipment has a unit for the user inputting at least a beneficiary, a remittance currency, and an amount of remittance as items required for application for foreign remittance, a unit for displaying an operation guidance screen for guidance for the user about items to be input for application for the foreign remittance, and a unit for outputting the items input through the input unit onto an output medium and for issuing it to the user. The counter terminal equipment has a unit for inputting the contents of the output medium received from the user, a display unit, and a unit for transmitting remittance data on the basis of the input contents. The computer checks the remittance data transmitted and transmits the result of the check to the counter terminal equipment.

The above-described arrangement provides the advantage that since remittance data is checked by the computer, it is possible to save the time and labor otherwise required for the teller to check complicated remittance data, in addition to the above-described advantages of the foreign remittance transaction terminal equipment.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention.

FIG. 2 illustrates an application form for foreign remittance.

FIG. 3 is a block diagram showing one embodiment of the foreign remittance transaction system according to the present invention.

FIGS. 7A, 7B, 7C and 7D are flowcharts showing the operation of the foreign remittance transaction system shown in FIG. 3.

FIG. 11 illustrates an operation of displaying the operation guidance screens at the lobby terminal equipment shown in FIG. 9.

FIGS. 12A, 12B, 12C and 12D are flowcharts showing a processing operation executed by the lobby terminal equipment shown in FIG. 9.

FIG. 13 illustrates a foreign remittance card operation select screen.

FIG. 15 illustrates a foreign remittance card confirm screen.

FIG. 16 illustrates a foreign remittance card select HELP screen.

FIG. 18 illustrates a remittance method select HELP screen.

FIG. 19 illustrates a sender's name input screen.

FIG. 20 illustrates a beneficiary's name input screen.

FIG. 22 illustrates a beneficiary's A/C input screen.

FIG. 23 illustrates a beneficiary's address input screen (1).

FIG. 24 illustrates a beneficiary's address input screen (2).

FIG. 25 illustrates a beneficiary's country select screen (1).

FIG. 26 illustrates a beneficiary's country select screen (2).

FIG. 27 illustrates a beneficiary's bank select screen.

FIG. 28 illustrates a branch select screen (1).

FIG. 29 illustrates a branch select screen (2).

FIG. 30 illustrates a beneficiary's country input screen.

FIG. 31 illustrates a beneficiary's bank input screen.

FIG. 32 illustrates a branch input screen.

FIG. 33 illustrates a charge payer select screen.

FIG. 34 illustrates a charge payer select HELP screen.

FIG. 35 illustrates a remittance currency select screen (1).
FIG. 36 illustrates a remittance currency select screen (2).
FIG. 37 illustrates a remittance currency select screen (3).
FIG. 38 illustrates an amount input screen.
FIG. 39 illustrates a settlement currency select screen.
FIG. 40 illustrates an amount fixing screen.
FIG. 41 illustrates an equivalent amount input screen.
FIG. 42 illustrates a charge paying method select screen.
FIG. 43 illustrates an input item confirm screen (1).
FIG. 44A illustrates an input item confirm screen (2).
FIG. 44B illustrates an input item confirm screen (3).
FIG. 50 illustrates a thanks screen.
FIG. 53 illustrates a card remittance service screen displayed at the counter terminal equipment shown in FIG. 51.
FIG. 51 shows the file arrangement of a host computer shown in FIG. 3.

DETAILED DESCRIPTION OF THE PREFERRED EMBODIMENTS

Figure 1:
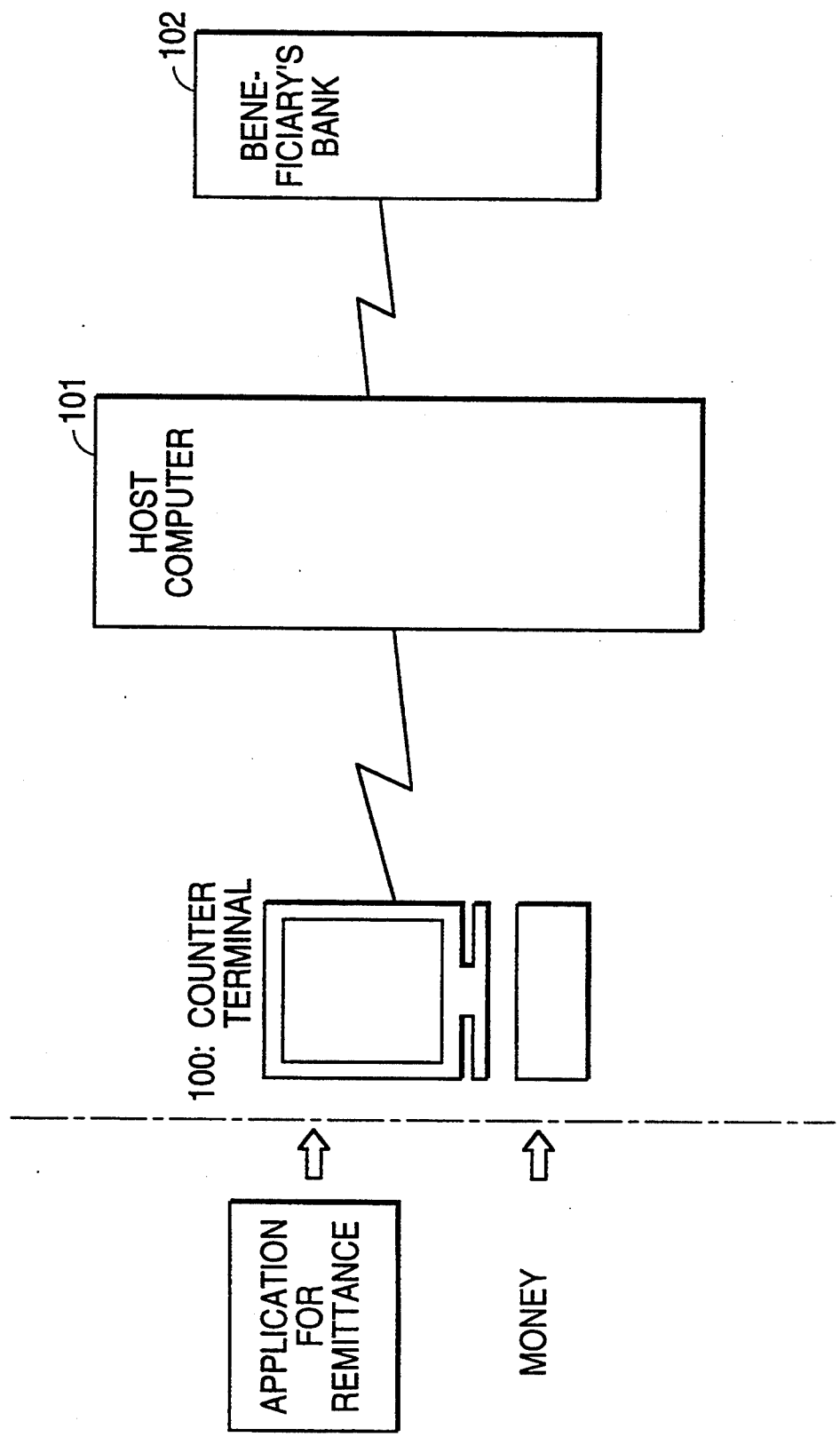
FIG. 1 shows the arrangement of a conventional foreign remittance transaction system.
Figure 4A:
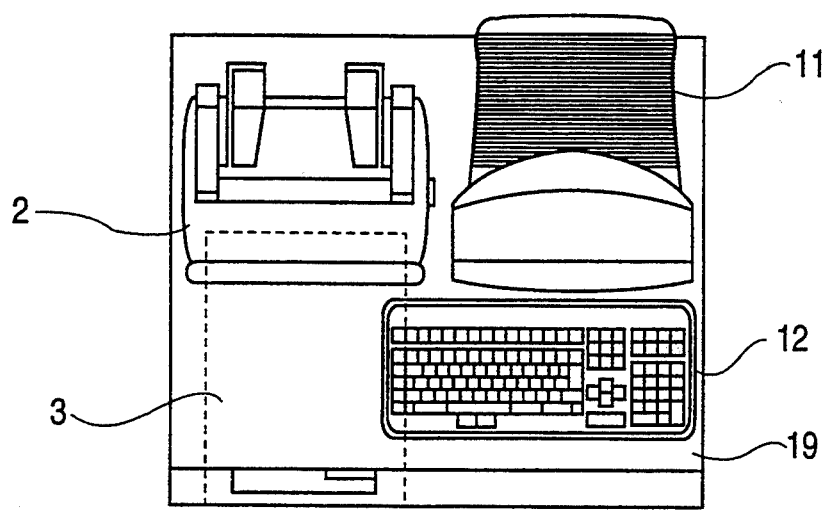
FIGS. 4A and 4B illustrates the arrangement of lobby terminal equipment employed in the system shown in FIG. 3.
Figure 4B:
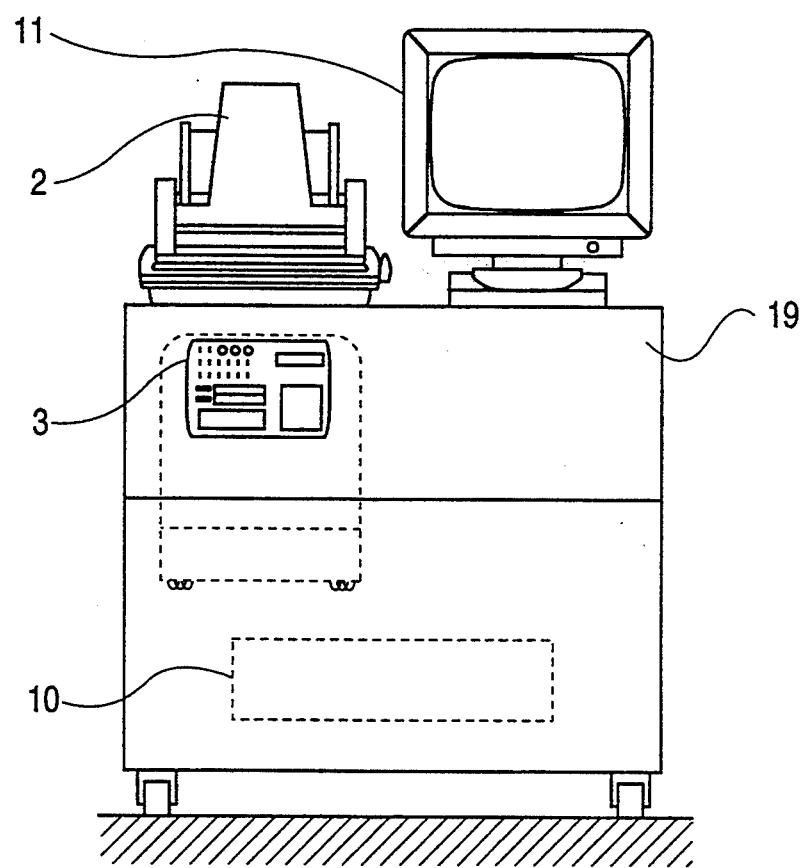
Figure 5:
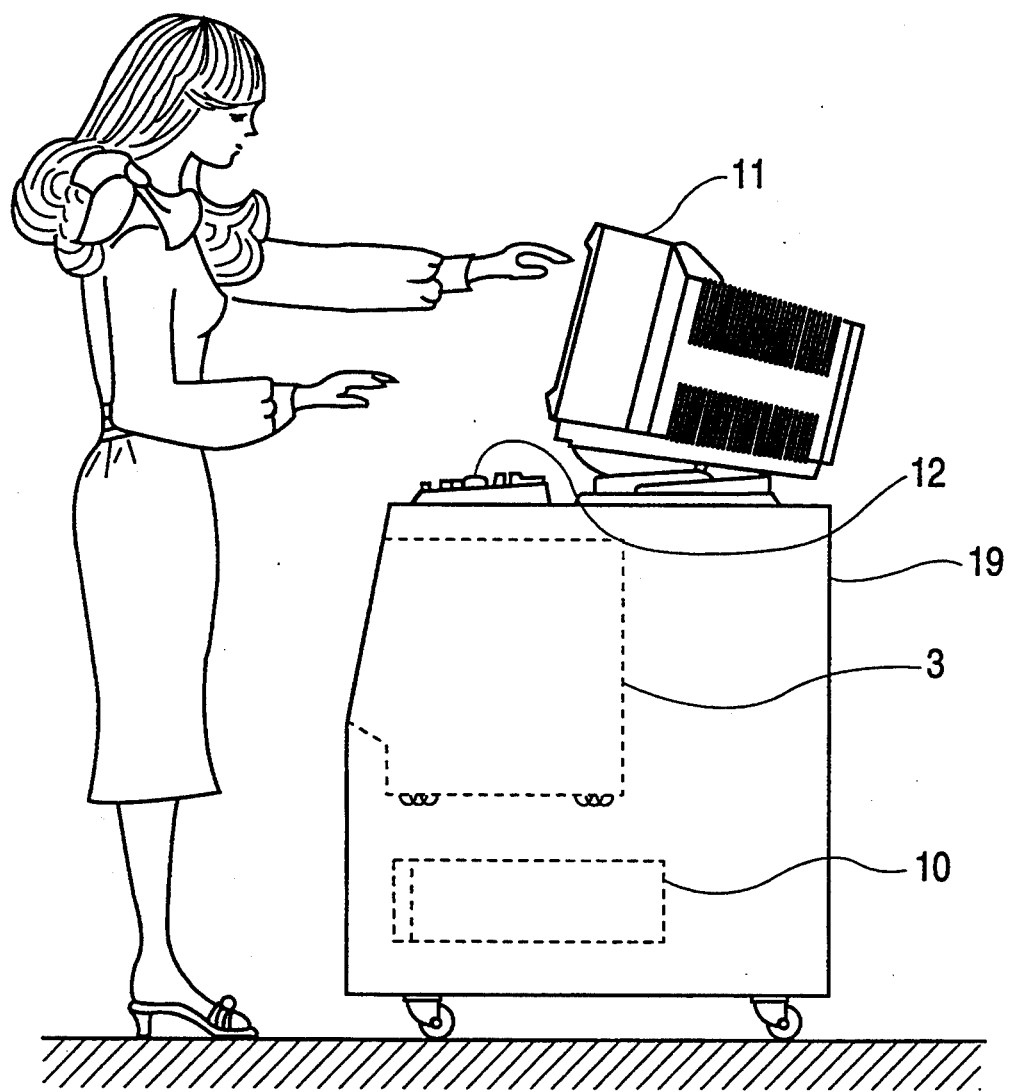
FIG. 5 is a side view of the lobby terminal equipment employed in the system shown in FIG. 3.
Figure 6:
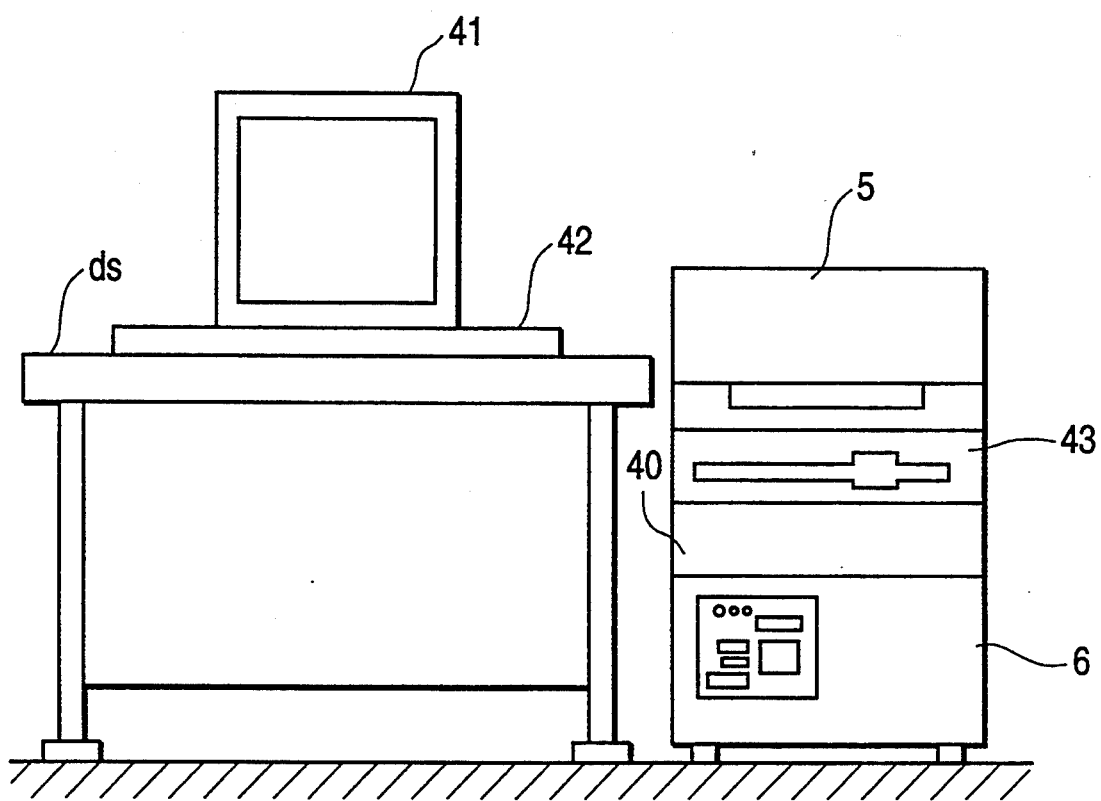
FIG. 6 shows the external appearance of counter terminal equipment employed in the system shown in FIG. 3.

FIG. 3 is a block diagram showing one embodiment of the foreign remittance transaction system according to the present invention. FIG. 4A is a top plan view of lobby terminal equipment employed in the system shown in FIG. 3. FIG. 4B is a front view of the lobby terminal equipment. FIG. 5 is a side view of the lobby terminal equipment. FIG. 6 shows the external appearance of counter terminal equipment employed in the system shown in FIG. 3.

Referring to FIG. 3, lobby terminal equipment 1 is installed in the lobby of a financial institution and operated by a customer who applies for remittance. A terminal unit la is connected with a printer 2 and a magnetic card reader/writer 3. The terminal unit 1a comprises a personal computer. The printer 2 prints and issues an application form for foreign remittance. The magnetic card reader/writer 3 writes remittance data on one of the magnetic cards 30 stocked therein and issues it. The magnetic card reader/writer 3 further reads the remittance data from the magnetic card 30 inserted into an insertion slot thereof, writes input remittance data to the magnetic card 30, and then delivers it. The lobby terminal equipment 1 comprises the terminal unit 1a, the printer 2, and the magnetic card reader/writer 3.

As shown in FIGS. 4A and 4B, the lobby terminal equipment 1 has an operator console 19 in which are disposed a controller 10 of the terminal unit 1a and the magnetic card reader/writer 3. On the operator console 19 are disposed a keyboard 12 for input, a display 11 for operation guidance, and the above-described printer 2.

The lobby terminal equipment 1 is designed for a user (a customer who applies for remittance) to input data for each item of an application form for foreign remittance by the keyboard 12 while looking at the operation guidance screen of the display 11, as shown in FIG. 5. The input contents are printed on an application form 21 for foreign remittance by the printer 2, and thus the printed application form 21 is issued. Meantime, pieces of remittance data, which are the input contents, are written on the magnetic card 30 and issued as a foreign remittance card by the magnetic card reader/writer 3.

Referring back to FIG. 3, counter terminal equipment 4 is provided at a foreign remittance counter of the financial institution and operated by a teller. A terminal unit 4a is connected with a printer 5 and a magnetic card reader/writer 6. The terminal unit 4a comprises a personal computer and is connected to a host computer 7. The printer 5 outputs a duplicate copy 51 of an application form for foreign remittance. The magnetic card reader/writer 6 reads the contents of the foreign remittance card 30 issued by the lobby terminal equipment 1 and inserted thereinto and inputs the read information to the terminal body unit 4a. Further, the magnetic card reader/writer 6 records on the foreign remittance card 30 the remittance data transmitted to the host computer 7 and returns the card 30 to the user. The counter terminal equipment 4 comprises the terminal unit 4a, the printer 5, and the magnetic card reader/writer 6.

As shown in FIG. 6, the counter terminal equipment 4 has a keyboard 42 and a display 41, which are placed on an operator console ds. By the operator console ds are provided the magnetic card reader/writer 6, a controller 40 of the terminal unit 4a, a floppy disk drive unit 43, and the printer 5.

Referring back to FIG. 3, the host computer 7 comprises a general-purpose large-sized computer. The host computer 7 checks the contents of the remittance data transmitted from the counter terminal equipment 4, selects the most suitable branch of the beneficiary's bank, and calculates remittance charges. The host computer 7 further transmits the remittance data to the beneficiary's bank 8 according to instructions from the counter terminal equipment 4, thereby transacting remittance.

Figure 7C:
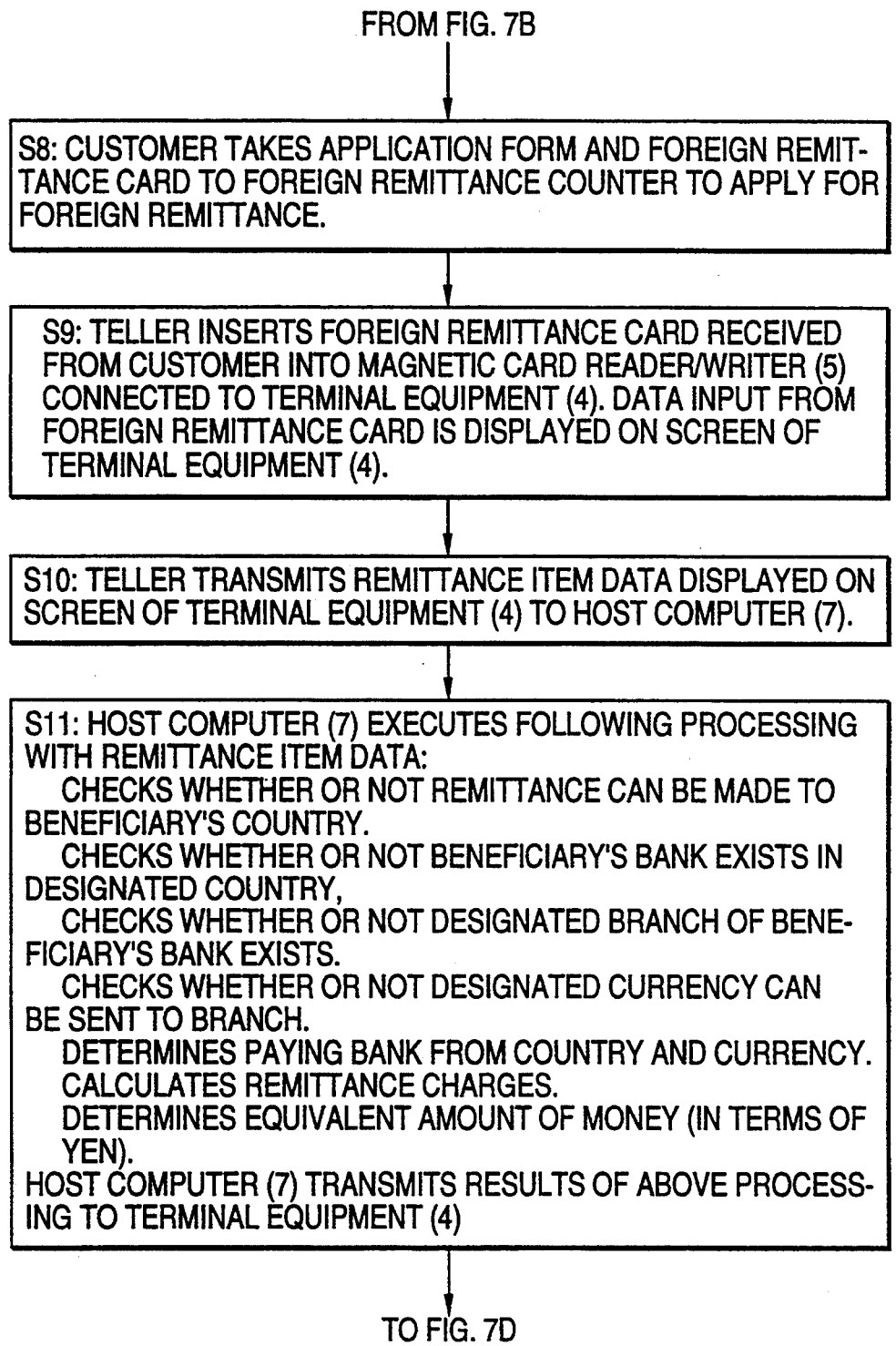
Figure 8:
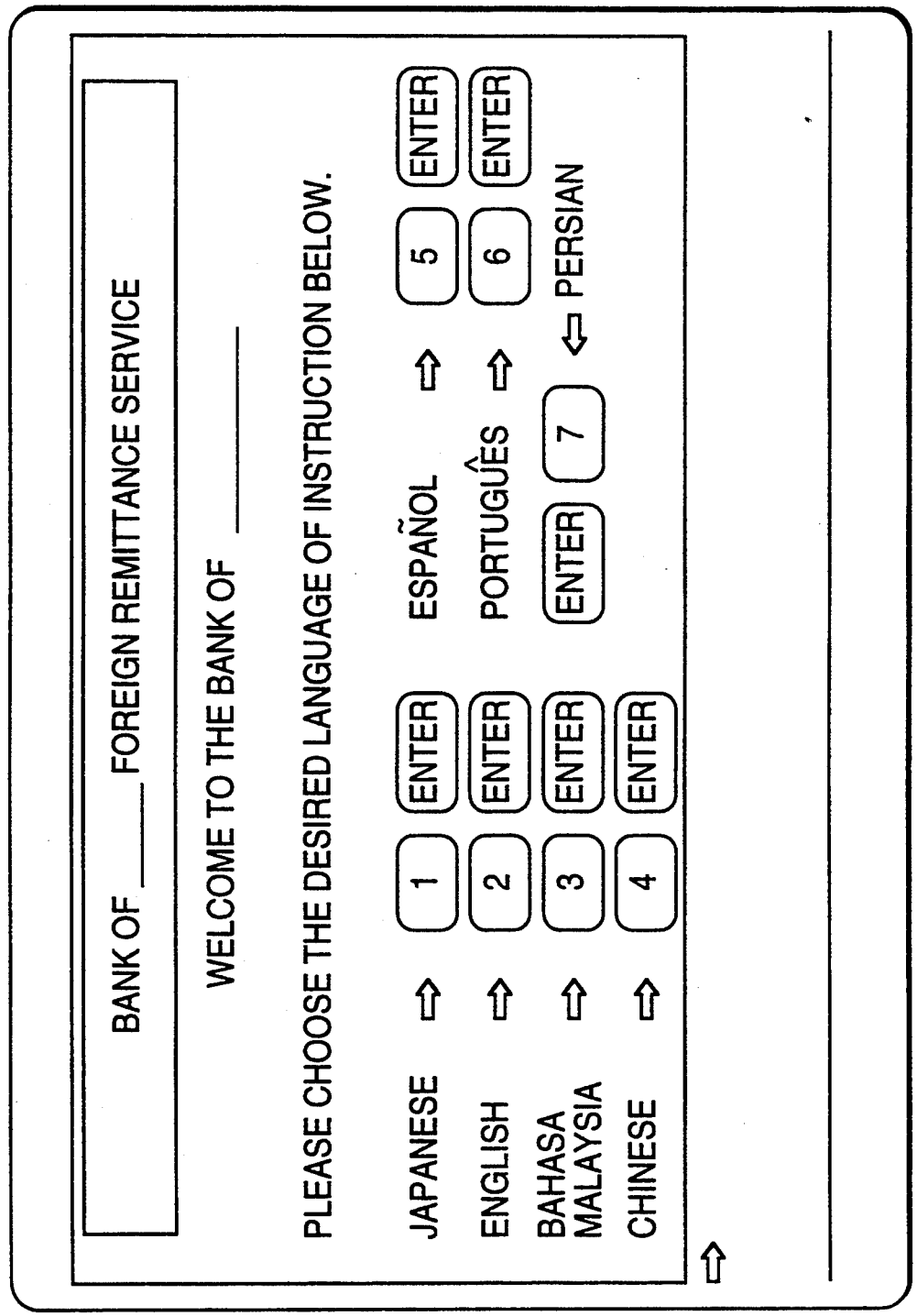
FIG. 8 illustrates a language select screen in the process shown in FIG. 7A.

FIGS. 7A, 7B, 7C and 7D are flowcharts showing the remittance transaction procedure of the foreign remittance transaction system, and FIG. 8 illustrates a language select screen for the remittance transaction procedure. The operation of the system shown in FIG. 3 will be explained below with reference to the flowcharts of FIGS. 7A to 7D.

(S1) In the initial state, the display 11 of the lobby terminal equipment 1 is displaying a language select screen as shown in FIG. 8. This screen is used to select the desired language from those displayed on the operation guidance screen. In the illustrated example, the menu is so constructed that the user can select the desired language from 7 different kinds of languages, i.e., Japanese, English, Malaysia, Chinese, Spanish, Portuguese, and Persian by pressing the corresponding ten-key switches "1" to "7" of the keyboard 12 displayed on the screen.

The customer selects the No. of the language which he or she can understand from the language select screen (menu) on the display 11 of the lobby terminal equipment 1, installed in the lobby, by the keyboard 12.

Thus, the following operations are guided by operation guidance screens described in the selected language, as explained later.

Next, a screen (shown in FIG. 13) for asking if the customer has a foreign remittance card appears on the display 11. If the customer has a foreign remittance card for the beneficiary (that is, if he or she is going to make remittance the contents of which are the same as those of the remittance previously made), the key "1" of the keyboard 12 is selected, whereas, if the customer has no foreign remittance card for the beneficiary, the key "2" of the keyboard 12 is selected.

(S2) If the customer selects the key indicating that he or she has a foreign remittance card for the beneficiary to which remittance is to be made, a screen (shown in FIG. 14) for prompting the customer to insert the foreign remittance card 30 appears on the display 11. The customer inserts the foreign remittance card 30 previously issued into the magnetic card reader/writer 3 to have the contents of the card 30 read by it.

(S3) Since the fixed items (sender's name, beneficiary's name, beneficiary's country, beneficiary's financial institution, etc.) of remittance data have already been written on the foreign remittance card 30, these items of data are input by reading the foreign remittance card 30. Accordingly, these items need not be input, and hence the screen on the display 11 sequentially changes to input screens (shown in FIGS. 33 to 38) for paying bank's charges and an amount of money to be remitted this time. The customer inputs data for these items by the keyboard 12, and then proceeds to Step S5. (S4) If the customer selects the key indicating that he or she has no foreign remittance card 30 for the beneficiary, guidance screens for each item to be input for an application form for foreign remittance sequentially appear on the display 11, i.e., guidance screens for sender's name, beneficiary's name, beneficiary's country, beneficiary's financial institution, amount of remittance, paying bank's charges, etc. (shown in FIGS. 19 to 33). The customer successively inputs these items by the keyboard 12 while looking at the screen of the display 11.

(S5) As shown in FIG. 7B, upon completion of the input operation, the items of data input to the lobby terminal equipment 1 are printed on an application form 21 for foreign remittance by the printer 2, and the printed application form. 21 is issued. At this time, if the data has been input by the foreign remittance card 30, the fixed items of data recorded on the foreign remittance card 30 and the items of data input by the keyboard 12 are printed on the application form 21. The format of the application form 21 for foreign remittance is the same as the conventional one as shown in FIG. 2.

(S6) Next, the items of data input to the lobby terminal equipment 1 are written to the foreign remittance card 30 by the magnetic card reader/writer 3, and the card 30 is delivered. At this time, if the items of data have been input by the foreign remittance card 30, the fixed items of data recorded on the foreign remittance card 30 and the items of data input by the keyboard 12 are written to the foreign remittance card 30. If the customer has no foreign remittance card 30, the input data items are written on one of the magnetic cards stocked in the magnetic card reader/writer 3, and the card is issued as a foreign remittance card (S7) The customer writes a message, purpose, permit No., date, address, signature, and telephone No. on the issued application form 21. Thus, an application form for foreign remittance similar to those conventionally used is completed.

(S8) Referring to FIG. 7C, the customer takes both the application form 21 and the foreign remittance card 30 to a teller at the foreign remittance counter to request him or her to make remittance.

(S9) The teller inserts the foreign remittance card 30 received from the customer into the magnetic card reader/writer 6 connected to the counter terminal equipment 4 to have the contents thereof read. The data read from the foreign remittance card 30 is displayed on the display 41 of the counter terminal equipment 4.

(S10) The teller confirms the items of remittance data (i.e., sender's name, beneficiary's name, beneficiary's country, beneficiary's financial institution, amount of remittance, and paying bank's charges) displayed on the display 41 of the counter terminal equipment 4, and presses the transmission key of the keyboard 42 to transmit the remittance data to the host computer 7.

(S11) The host computer 7 checks the items of remittance data. That is, it is checked whether or not remittance can be made to the beneficiary's country, whether or not the beneficiary's bank exits in the designated country, whether or not the designated branch of the beneficiary's bank exists, and whether or not the selected kind of money can be remitted to the branch of the beneficiary's bank. Then, the computer 7 calculates remittance charges and determines an equivalent amount of money (in terms of yen, for example) to the amount of remittance. The computer 7 sends the results of these processing operations to the counter terminal equipment 4.

(S12) Referring to FIG. 7D, the contents of the reply from the host computer 7 are displayed on the display 41 of the counter terminal equipment 4. The teller confirms the displayed contents of the reply. If the contents of the reply(the results of the processing ) are good, there is no change in the contents of the display made by the display 41. However, there are cases where the contents of the reply are not good: e.g., the designated beneficiary's bank does not exist in the beneficiary's country; the designated branch of the beneficiary's bank does not exist in the beneficiary's country; or the designated kind of currency cannot be remitted to the designated branch of the beneficiary's bank. In such a case, the display color of the item on the display 41 that is not correct changes to red, for example. At this time, the teller informs the customer that the item concerned is not correct, and changes it according to the customer's instructions by the keyboard 42. Then, the teller prints an application form (duplicate copy) 51 for foreign remittance by the printer 5 connected to the counter terminal equipment 4.

(S13) The teller receives the equivalent amount of money and the remittance charges from the customer.

(S14) The teller presses the transmission key of the keyboard 42 to transmit to the host computer 7 the remittance item data displayed on the display 41 of the counter terminal equipment 4. The host computer 7 rechecks the remittance item data in the same way as in the above-described Step S11, and then transmits the result of the check to the counter terminal equipment 4.

(S15) The teller confirms the contents of the reply from the host computer 7 displayed on the display 41 of the counter terminal equipment 4, and records the contents of the remittance on the foreign remittance card 30 by the magnetic card reader/writer 6. (S16) Then, the teller hands the customer change, if any, and the foreign remittance card 30, together with the application form (duplicate copy) 51. Thus, the transaction of the remittance is completed.

It should be noted that the remittance item data transmitted to the host computer 7 is transmitted to the beneficiary's bank in real time or by batch processing.

Thus, since the remittance items are input by the lobby terminal equipment 1 according to the operation guidance, the remittance items can be surely and readily input. In addition, since an application form for foreign remittance printed with the input data is prepared, the customer need not prepare an application form separately. Furthermore, since the operation guidance is given in the desired language, customers who use various languages can perform the input operation with ease.

In addition, since the foreign remittance card having the remittance items recorded thereon is issued, the remittance items can be automatically input at the counter terminal equipment 4 by using the card, which saves the teller a great deal of time and labor. If the customer brings the foreign remittance card when making remittance next time, the fixed items need not be input, which saves the customer time and labor required for the input operation. Moreover, since these items of remittance data are checked and charges are calculated by the host computer 7 before the transaction of remittance, the teller need not execute these processing operations. Thus, the system saves the teller a great deal of time and labor.

Figure 9:
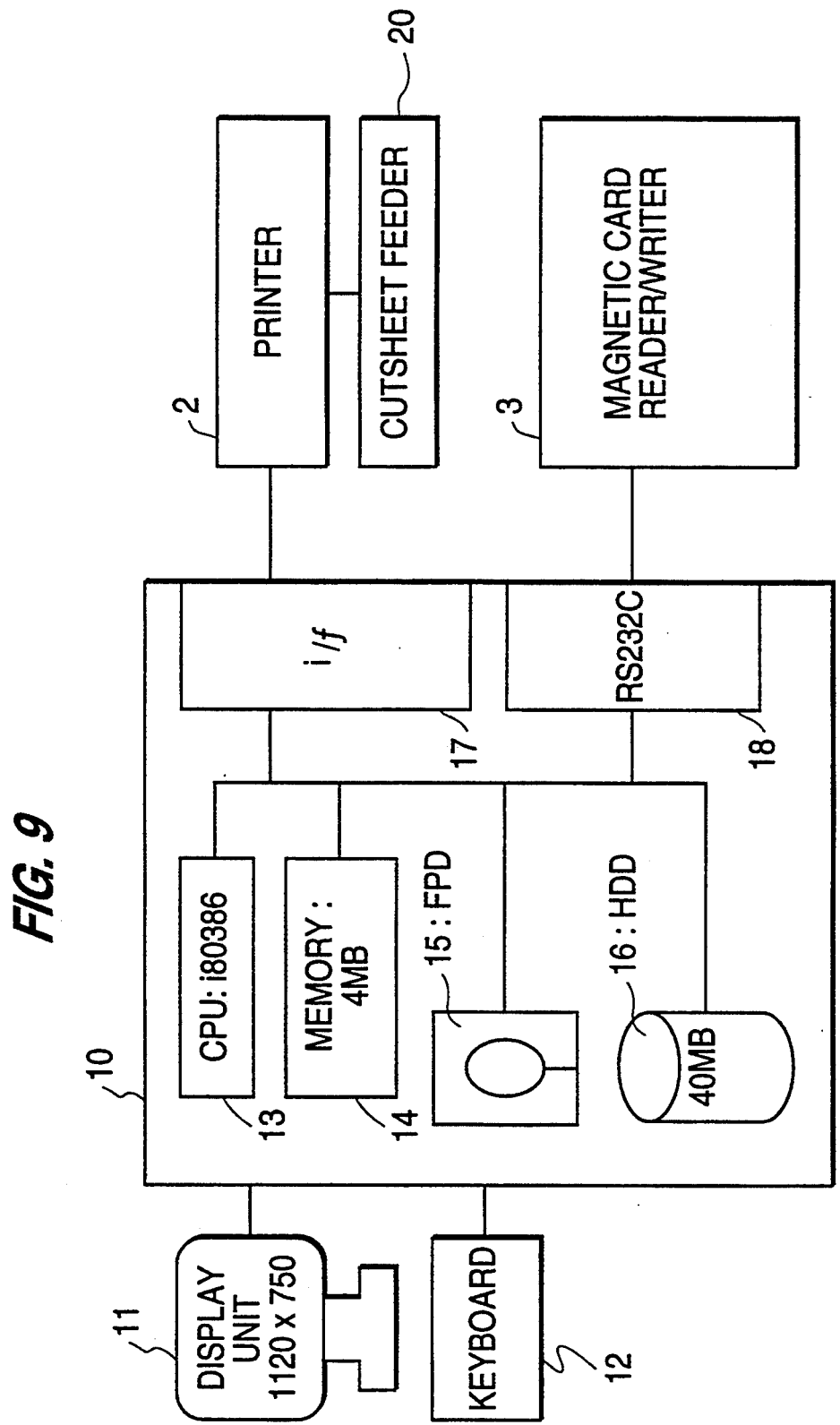
FIG. 9 is a block diagram of the lobby terminal equipment shown in FIG. 3.
Figure 10:
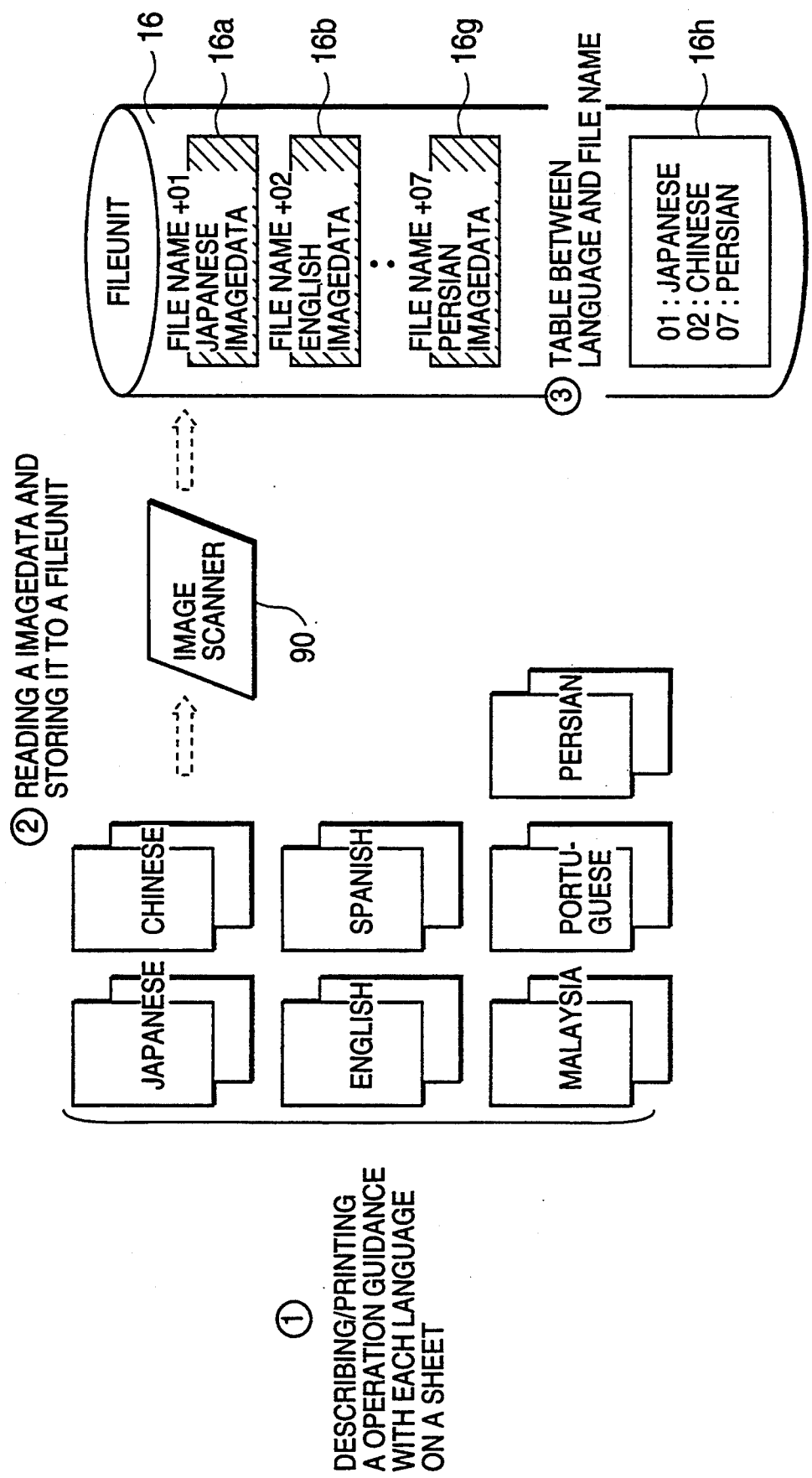
FIG. 10 illustrates an operation of registering data on operation guidance screens displayed at the lobby terminal equipment shown in FIG. 9.

FIG. 9 is a block diagram of the lobby terminal equipment shown in FIG. 3. FIG. 10 illustrates an operation of registering data on operation guidance screens displayed at the lobby terminal equipment shown in FIG. 9. FIG. 11 illustrates an operation of displaying the operation guidance screens at the lobby terminal equipment shown in FIG. 9.

Referring to FIG. 9, a controller 10 comprises a personal computer (FMR-70HL3, manufactured by Fujitsu Ltd). The controller 10 has a CPU (i80386, manufactured by Intel) 13, a memory 14, a floppy disk drive unit 15, a hard disk unit 16, a Centronics interface circuit 17, and an RS232C interface circuit 18. The controller 10 is connected with a color display 11 and a keyboard 12.

In addition, a printer 2 is connected to the Centronics interface circuit 17 of the controller 10. The printer 2 is provided with a cut sheet feeder 20 for feeding the printer 2 with sheets for remittance application forms set therein. Furthermore, a magnetic card reader/writer 3 having a card hopper is connected to the RS232C interface circuit 18 of the controller 10.

Next, a registering operation for displaying characters in various languages on the screen of the lobby terminal equipment 1 will be explained with reference to FIG. 10. It is not easy to set character codes in each individual language in order to display characters in various languages. Therefore, operation guidance given in various languages is registered in the form of images. That is, the contents to be displayed on the screen are written on sheets of paper. The sheets are of A4 size (210 mm×297 mm) ①. The contents of operation guide are written or printed on the sheets of paper in each language to thereby prepare operation guidance screens. There are more than 30 different kinds of operation guidance screen, as shown in FIGS. 13 to 49, for example. ② Next, an image scanner 90 is connected to the hand disk unit 16 of controller 10 to read the sheets written in various languages as image data, and the image data is stored in files 16a to 16g provided for each language on the built-in hard disk unit 16 in the controller 10. ③ Further, the hard disk unit 16 is stored with a table 16h representing the correspondence between the file names and the languages. Thus, it is unnecessary to set character codes in various languages and to prepare and store character patterns corresponding to the character codes. Accordingly, screens written in various languages can also readily be registered by the system user.

Next, an operation of displaying operation guidance screens written in the selected language by using the above-described file will be explained with reference to FIG. 11.

During IPL (Initial Program Load), the controller 10 of the lobby terminal equipment 1 reads into the memory 14 the table 16h representing the correspondence between the image data files and the screen Nos. stored on the hard disk unit 16. The following screens are displayed according to the contents of the table 16h. First, a language select screen of the screen No. "1", which is shown in FIG. 8, is displayed.

As has been described above, the lobby terminal equipment 1 first displays "language select screen". This screen has the numerals "1" to "7" put in association with Japanese, English, Malaysia, Chinese, Spanish, Portuguese, and Persian, respectively, as has been described in connection with FIG. 8. Therefore, if the customer presses any of the keys "1" to "7" of the keyboard 12, guidance in the desired language is subsequently displayed.

When an image is to be displayed on the screen, an image data file name corresponding to the No. of the screen to be displayed next is determined from the table 16h, and image data corresponding to the screen No. is read from the files 16a to 16g and displayed on the screen.

FIGS. 12A, 12B, 12C and 12D are flowcharts showing processing executed by the lobby terminal equipment 1 shown in FIG. 9. FIGS. 13 to 19 illustrate various operation guidance screens. These operation guidance screens are written in English by way of example.

(SS1) The controller 10 displays the above-described language select screen on the display 11 as an initial screen. This screen has keys displayed to correspond to the respective languages, as shown in FIG. 8.

(SS2) When any of the keys "1" to "7" corresponding to the above-described languages is pressed and the enter key is also pressed, the selected language is designated, and thereafter, operation guidance screens based on the image data in the designated language are sequentially displayed. First, a foreign remittance card operation select screen as shown in FIG. 13 is displayed. With this screen, if the customer has a foreign remittance card, the key "1" is pressed, whereas, if he or she has no foreign remittance card, the key "2" is pressed. If the magnetic card reader/writer 3 is not connected to the lobby terminal equipment 1, this screen is not displayed, and the process proceeds to Step SS6.

Figure 14:
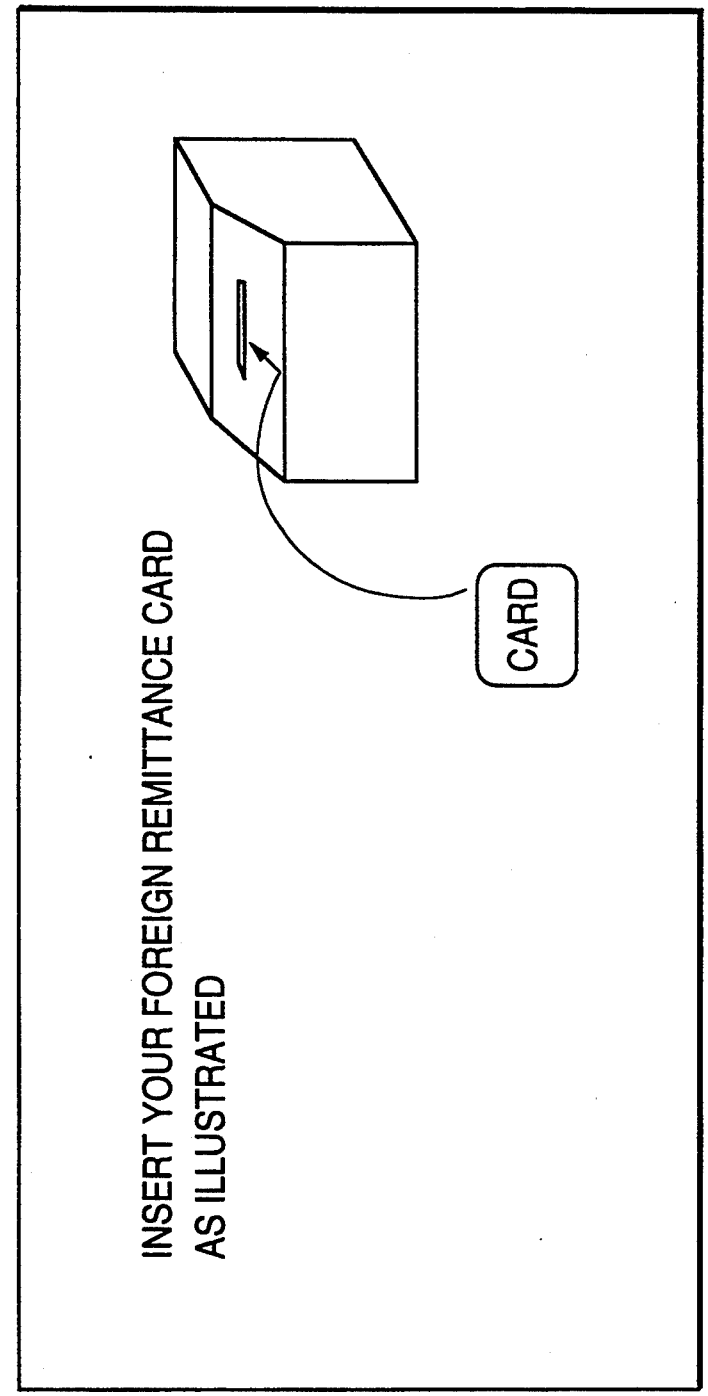
FIG. 14 illustrates a foreign remittance card insert screen.

(SS3) If both the key "1" and the enter key are pressed, it is recognized that the customer has a foreign remittance card. Consequently, a foreign remittance card insert screen as shown in FIG. 14 is displayed on the display 11 to prompt the customer to insert the foreign remittance card.

(SS4) When the foreign remittance card 30 is inserted into the magnetic card reader/writer 3, the controller 10 reads the contents of the card 30 and stores the read contents into the memory 14. Then, the controller 10 displays on the display 11 a foreign remittance card confirm screen as shown in FIG. 15, which displays the read contents (fixed items) of the foreign remittance card 30. If the customer presses the enter key at this step, the process proceeds to a process point immediately before Step SS30 in FIG. 12C.

(SS5) On the other hand, if the customer presses the PF10 key of the keyboard 12 with the foreign remittance card operation select screen at Step S2, a foreign remittance card select HELP screen as shown in FIG. 16 appears on the display 11. This HELP screen explains that the foreign remittance card 30 is stored with the record of each item of remittance data, and that if once the customer uses the lobby terminal equipment 1, the card 30 will be issued, and further that the use of the card 30 saves the customer inputting the fixed terms. If the customer presses the PF10 key of the keyboard 12 again, the display returns to the foreign remittance card operation select screen.

Figure 17:
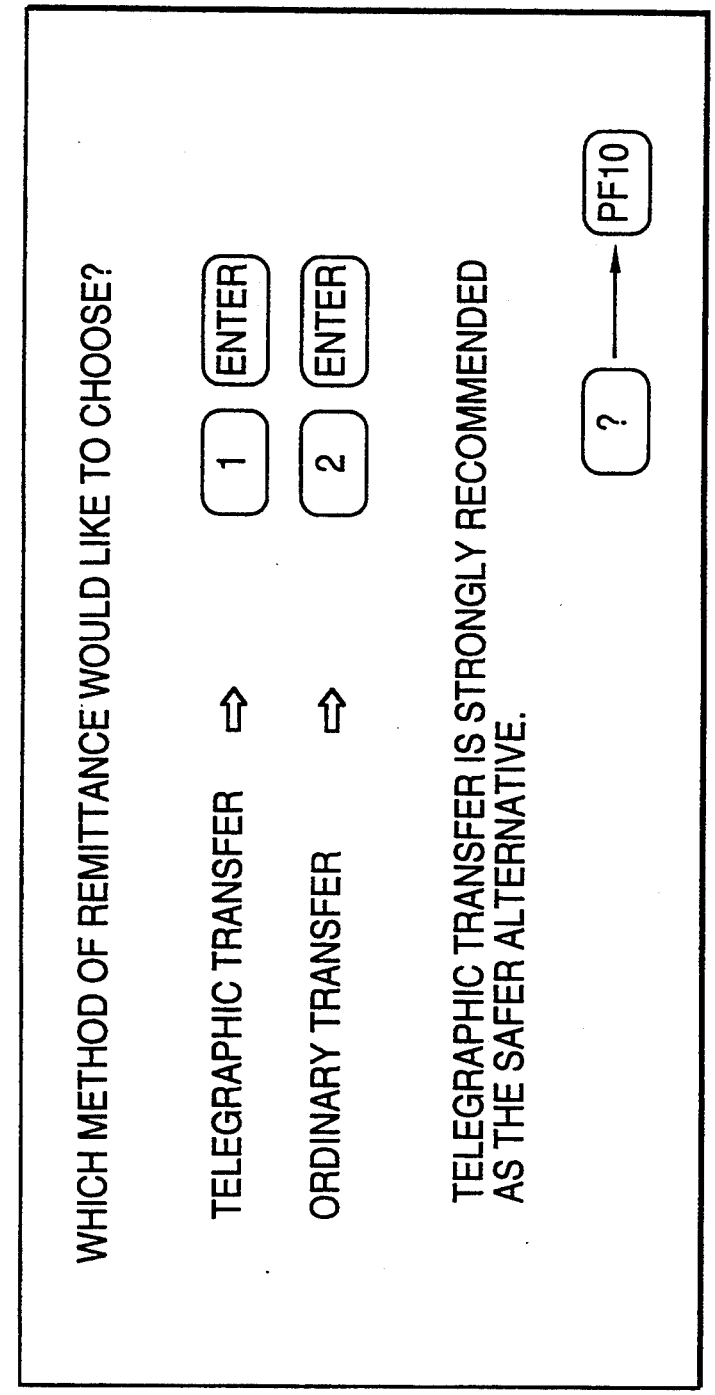
FIG. 17 illustrates a-remittance method select screen.

(SS6) If the customer presses the key "2" and the enter key with the foreign remittance card operation select screen at Step SS2, a remittance method select screen as shown in FIG. 17 appears on the display 11. In this screen, if the kind of remittance is "TT (Telegraphic Transfer)", the key "1" is pressed, whereas, if the kind of remittance is "OT (Ordinary Transfer)", the key "2" is pressed.

(SS7) If the customer presses the PF10 key of the keyboard 12 with the remittance method select screen at Step SS6, a remittance method select HELP screen as shown in FIG. 18 appears on the display 11. The HELP screen explains the contents of the two different kinds of remittance, i.e., "TT" and "OT". If the customer presses the PF10 key again, the display returns to the remittance method select screen.

(SS8) If the customer presses either the key "1" (to designate the kind of remittance "TT") or the key "2" (to designate the kind of remittance "OT") and then presses the enter key, a sender's name input screen as shown in FIG. 19 appears on the keyboard 12. With this screen, the sender's name can be input using English letters, numerals, and symbols with in 35 digits. It should be noted that if the PF5 key is pressed, the display returns to the remittance method select screen at Step SS6, thus enabling reselection of a kind of remittance.

(SS9) If the enter key is pressed upon completion of inputting the sender's name with the sender's name input screen at Step SS8, a beneficiary's name input screen as shown in FIG. 20 appears on the display 11. With this screen, the beneficiary's name can be input using English letters, numerals, and symbols within 35 digits. It should be noted that if the PF5 key is pressed, the display returns to the sender's name input screen at Step SS8, thus enabling the sender's name to be input over again.

Figure 21:
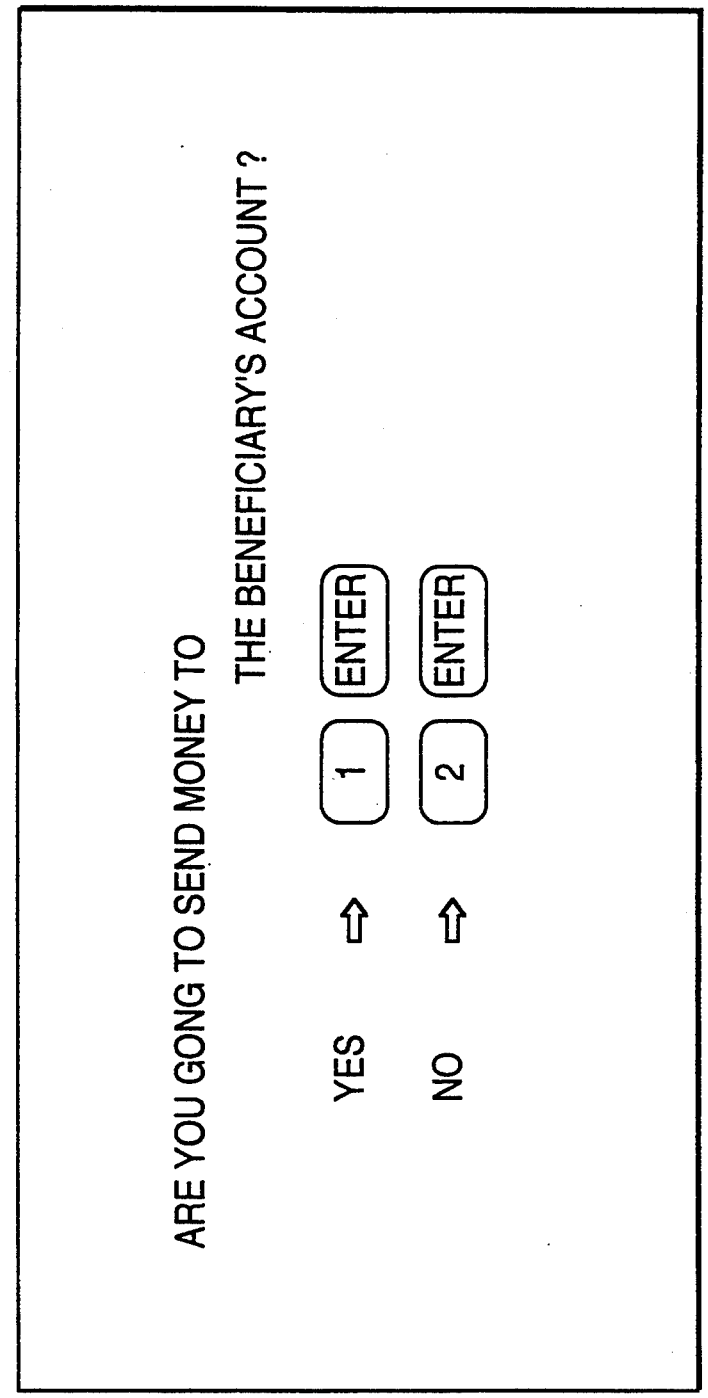
FIG. 21 illustrates a beneficiary's A/C (Account No.) select screen.

(SS10) If the customer presses the enter key upon completion of inputting the beneficiary's name with the beneficiary's name input screen at Step SS9, a beneficiary's A/C (Account No.) select screen as shown in FIG. 21 appears on the display 11. With this screen, if the beneficiary's A/C is available, the key "1" is pressed, whereas, the beneficiary's A/C is unavailable, the key "2" is pressed.

(SS11) If the customer presses the key "1" (to send money to the beneficiary's A/C) and then presses the enter key at Step SS10, a beneficiary's A/C input screen as shown in FIG. 22 appears on the display 11. With this screen, the beneficiary's A/C can be input using English letters and numerals within 34 digits. It should be noted that if the PF5 key is pressed, the display returns to the beneficiary's A/C select screen at Step SS10, thus enabling reselection as to the beneficiary's A/C.

(SS12) If the customer presses the key "2" (to indicate that he or she is not going to send money to the beneficiary's A/C) and then presses the enter key at Step SS10, a beneficiary's address input screen (1) as shown in FIG. 23 appears on the display 11. With this screen, the beneficiary's address can be input using English letters, numerals, and symbols within 80 digits. It should be noted that if the PF5 key is pressed, the display returns to the beneficiary's A/C select screen at Step SS10, thus enabling reselection as to the beneficiary's A/C.

(SS13) If the customer presses the PF12 key of the keyboard 12 and then presses the enter key at Step SS12, a beneficiary's address input screen (2) as shown in FIG. 24, which is similar to the beneficiary's address input screen (1) shown in FIG. 23, appears on the display 11. With this screen, English letters, numerals, and/or symbols can be input within 25 digits in addition to the number of input digits for the beneficiary's address input screen (1). It should be noted that if the PF5 key is pressed, the display returns to the beneficiary's address input screen (1) at Step SS12, thus enabling the beneficiary's address to be input over again with the beneficiary's address input screen (1).

(SS14) If the customer presses the enter key upon completion of the inputting operation at Step SS11 or SS12 or SS13, a beneficiary's country select screen (1) as shown in FIG. 25 appears on the display 11. This screen displays the names of 12 countries of first priority, which can be selected by pressing the corresponding keys "1" to "12". It should be noted that if the PF5 key is pressed, the display returns to the select screen or input screen at Step S11 or SS12 or SS13, thus enabling reselection or re-inputting.

(SS15) If the customer presses the PF12 key of the keyboard 12 at Step SS14, a beneficiary's country select screen (2) as shown in FIG. 26, which is similar to the beneficiary's country select screen (1) shown in FIG. 25, appears on the display 11. This screen displays the names of 12 countries of second priority, which can be selected by pressing the corresponding keys "13" to "24". It should be noted that if the PF5 key is pressed, the display returns to the beneficiary's country select screen (1) at Step SS14, thus enabling reselection of the beneficiary's country.

(SS16) If the customer presses any of the keys "1" to "24" and then presses the enter key at Step SS14 or SS15, a beneficiary's bank select screen as shown in FIG. 27 appears on the display 11. This screen displays the names of 7 banks of high priority, together with one option which may be selected to designate other bank. These banks can be selected by pressing the corresponding keys "1" to "8". It should be noted that if the PF5 key is pressed, the display returns to the beneficiary's country select screen (1) at Step SS14, thus enabling reselection of the beneficiary's country.

(SS17) If the customer presses any of the keys "1" to "7" and the enter key at Step SS16, a branch select screen (1) as shown in FIG. 28 appears on the display 11. This screen displays the names of 5 branches of first priority among those of the beneficiary's bank selected.

These branches can be selected by pressing the corresponding keys "1" to "5". It should be noted that if the PF5 key is pressed, the display returns to the beneficiary's bank select screen at Step SS16, thus enabling reselection of the beneficiary's bank.

(SS18) If the customer presses the PF12 key of the keyboard 12 at Step SS17, a branch select screen (2) as shown in FIG. 29, which is similar to the branch select screen (1) shown in FIG. 28, appears on the display 11. This screen displays the names of 4 branches of second priority. These branches can be selected by pressing the corresponding keys "6" to "9". It should be noted that if the PF5 key is pressed, the display returns to the branch select screen (1) at Step SS17, thus enabling reselection of a branch of the beneficiary's bank selected.

(SS19) If both the key "24" and the enter key at Step SS14 or SS15, a beneficiary's country input screen as shown in FIG. 30 appears on the display 11. With this screen, the name of the beneficiary's country can be input using English letters and symbols within 20 digits. It should be noted that if the PF5 key is pressed, the display returns to the beneficiary's country select screen (1) at Step SS14, thus enabling reselection of the beneficiary's country.

(SS20) If the customer presses the enter key upon completion of the inputting operation at Step SS19 or presses both the key "8" and the enter key at Step SS17, a beneficiary's bank input screen as shown in FIG. 31 appears on the display 11. With this screen, the name of the beneficiary's bank can be input using English letters, numerals and symbols within 34 digits. It should be noted that if the PF5 key is pressed, the display returns to the previous screen, thus enabling reselection or re-inputting.

(SS21) If the customer presses the enter key upon completion of the inputting operation at Step SS20 or presses both the key "10" and the enter key at Step SS17 or SS18, a branch input screen as shown in FIG. 32 appears on the display 11. With this screen, the name of a branch of the beneficiary's bank can be input using English letters, numerals and symbols within 68 digits. It should be noted that if the PF5 key is pressed, the display returns to the previous screen, thus enabling reselection or re-inputting.

(SS22) If the customer selects a branch of the beneficiary's bank at Step SS17 or SS18 or inputs the name of a branch and presses the enter key at Step SS21, a charge payer select screen as shown in FIG. 33 appears on the display 11. With this screen, if the beneficiary is to pay, the key "1" is pressed, whereas, if the sender is to pay, the key "2" is pressed. It should be noted that if the PF5 key is pressed, the display returns to the previous screen, thus enabling reselection or re-inputting.

(SS23) If the PF10 key is pressed at Step SS22, a charge payer select HELP screen as shown in FIG. 34 appears on the display 11. The HELP screen explains the meaning of the bank's charges. If the PF10 key is pressed with this HELP screen, the display returns to the charge payer select screen at Step SS22.

(SS24) If the customer presses either the key "1" or "2" and then presses the enter key at Step SS22, a remittance currency select screen (1) as shown in FIG. 35 appears on the display 11. This screen displays 12 different kinds of currency of first priority, which can be selected by pressing the corresponding keys "1" to "12". It should be noted that if the PF5 key is pressed, the display returns to the previous screen, thus enabling reselection.

(SS25) If the PF12 key is pressed at Step SS24, a remittance currency select screen (2) as shown in FIG. 36, which is similar to the remittance currency select screen (1) shown in FIG. 35, appears on the display 11. This screen displays 12 different kinds of currency of second priority, which can be selected by pressing the corresponding keys "13" to "24". It should be noted that if the PF5 key is pressed, the display returns to the previous screen, thus enabling reselection.

(SS26) If the PF12 key is pressed at Step SS25, a remittance currency select screen (3) as shown in FIG. 37, which is similar to the remittance Currency select screen (1) shown in FIG. 35, appears on the display 11. This screen displays 10 different kinds of currency of third priority, which can be selected by pressing the corresponding keys "25" to "34". It should be noted that if the PF5 key is pressed, the display returns to the previous screen, thus enabling reselection.

(SS27) If the customer presses any of the keys "1" to "34" and the enter key at Step SS24 or SS25 or SS26 and the remittance currency selected is "YEN", an amount input screen as shown in FIG. 38 appears on the display 11. With this screen, the amount of money to be sent can be input using numerals and decimal point within 11 digits. It should be noted that if the PF5 key is pressed, the display returns to the previous screen, thus enabling reselection.

(SS28) If the customer presses the enter key upon completion of the inputting operation at Step SS27, a settlement currency select screen as shown in FIG. 39 appears on the display 11. With this screen, if the key "1" is pressed, YEN (SPOT) is selected, whereas, if the key "2" is pressed, foreign currency (NOEX) is selected. It should be noted that if the PF5 key is pressed, the display returns to the previous screen, thus enabling the amount of remittance to be input over again.

Figure 12B:
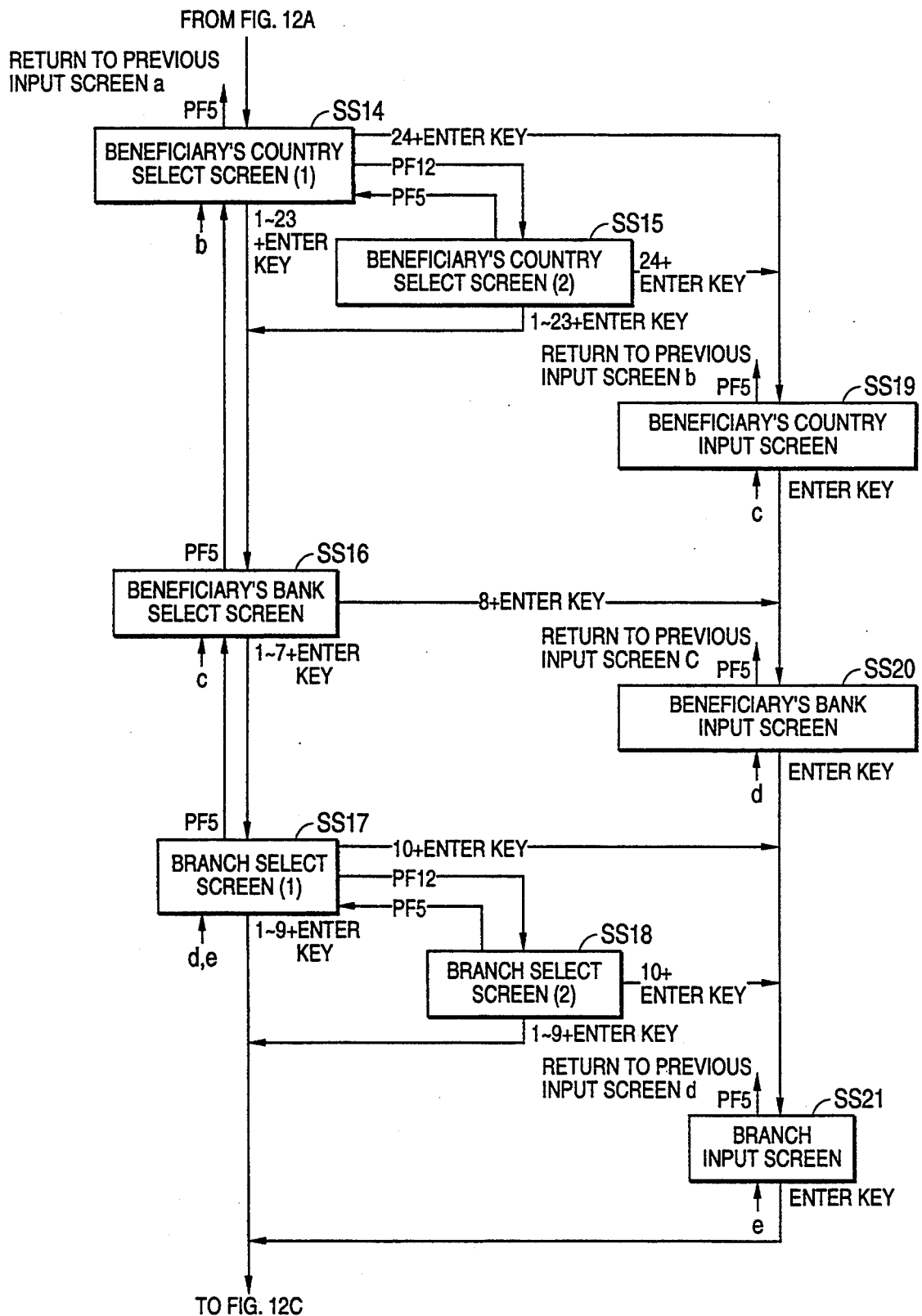
Figure 12C:
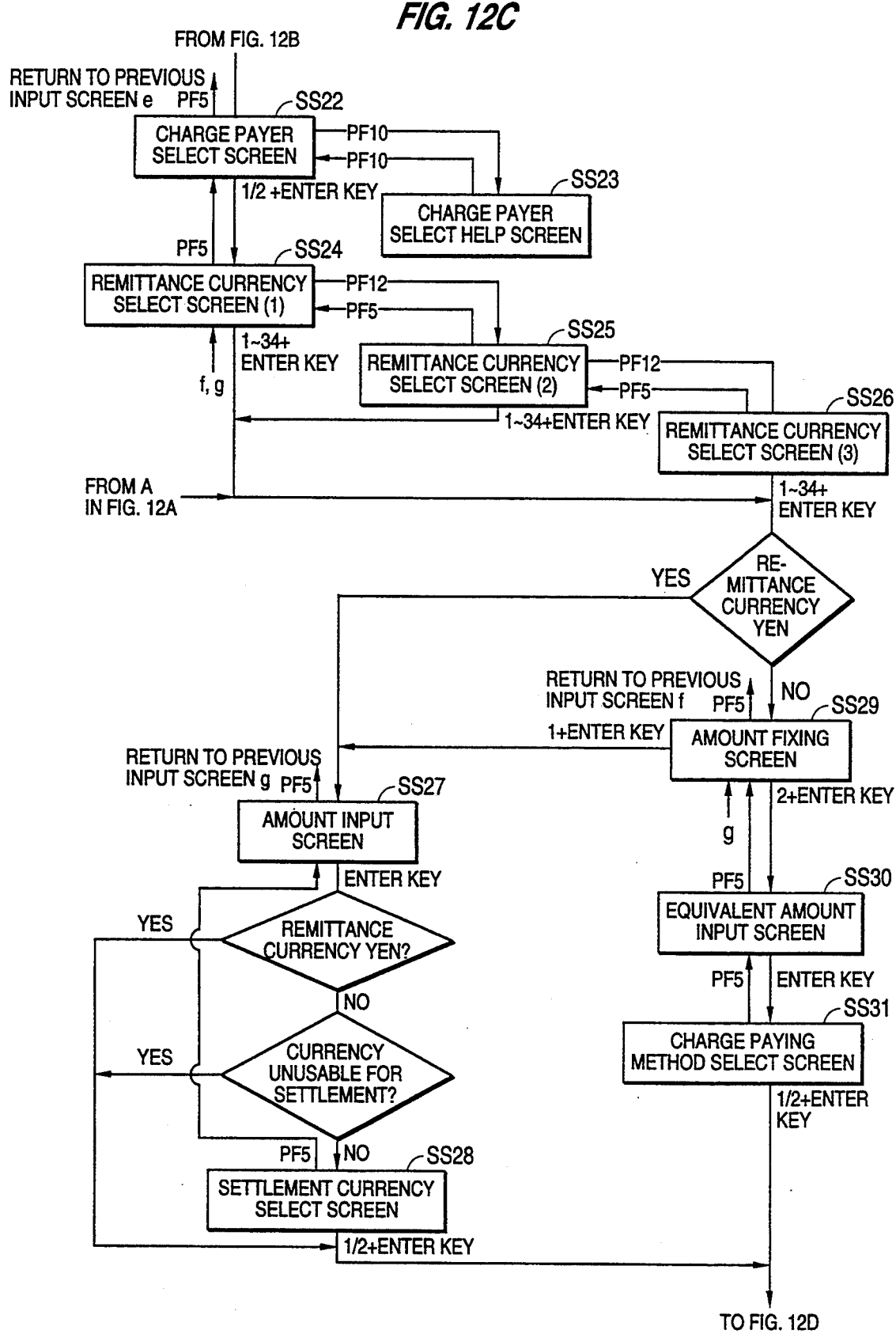
Figure 12D:
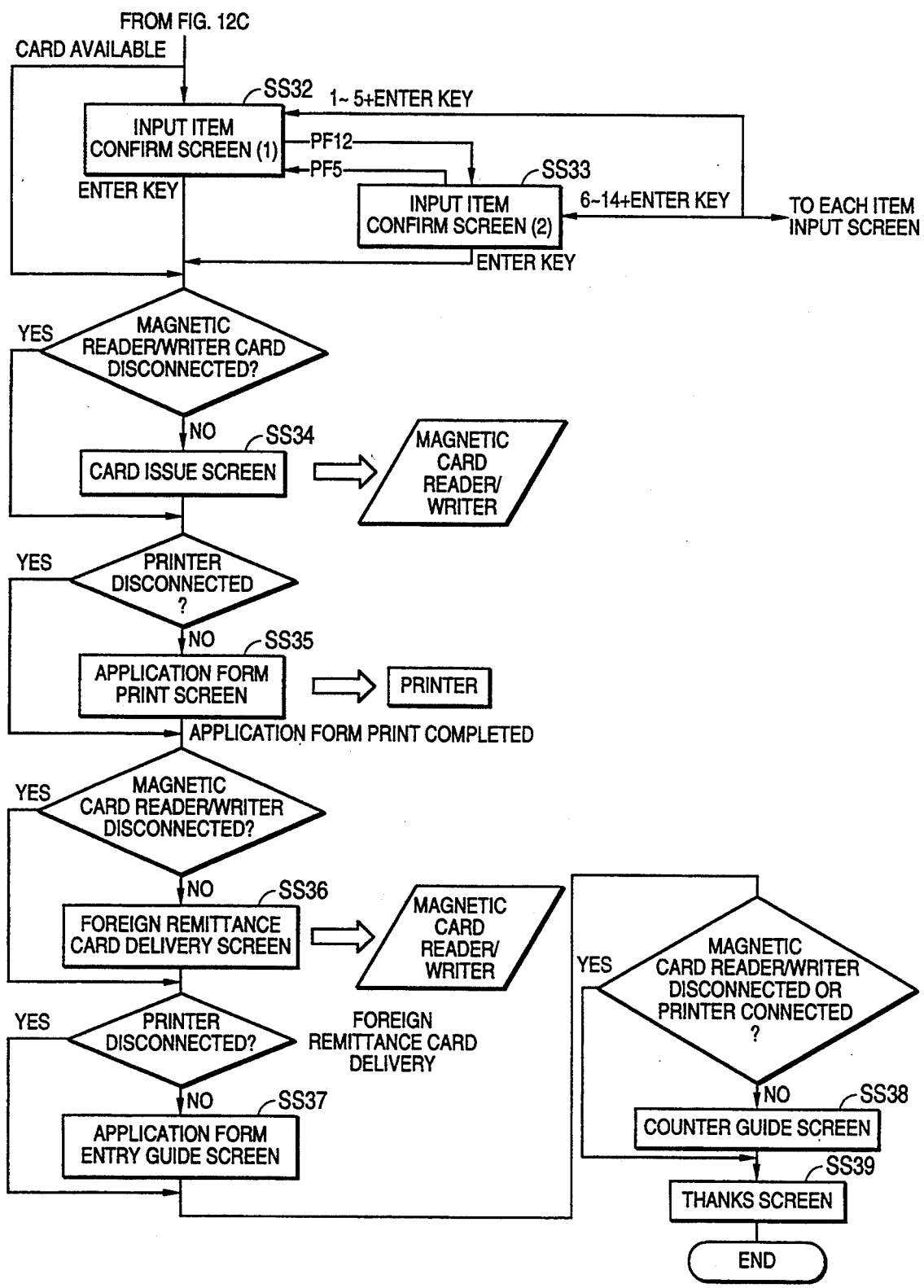

If the remittance currency is YEN or a currency which cannot be used for settlement, the process jumps Step SS29 and proceeds to Step SS32 shown in FIG. 12D.

(SS29) If the customer presses any of the keys "1" to "34" and the enter key at Step SS24 or SS25 or SS26 and the selected currency is other than "YEN", an amount fixing screen as shown in FIG.40 appears on the display 11. With this screen, if the amount of money to be sent in the selected currency has been fixed, the key "1" is pressed, whereas, if it has not yet been fixed, the key "2" is pressed. If the key "1" is pressed at this step, the process proceeds to Step SS27 for inputting the amount of remittance. It should be noted that if the PF5 key is pressed, the display returns to the previous screen, thus enabling reselection.

(SS30) If the key "2" (not fixed), an equivalent amount input screen as shown in FIG. 41 appears on the display 11. With this screen, the equivalent amount to be sent in YEN can be input using numerals within 11 digits. It should be noted that if the PF5 key is pressed, the display returns to the previous screen, thus enabling reselection.

(SS31) If the customer presses the enter key at Step SS30, a charge paying method select screen as shown in FIG. 42 appears on the display 11. With this screen, if the sender would like to pay the charges separately from the amount of remittance, the key "1" is pressed, whereas, if the sender wants the charges to be included in the remittance, the key "2" is pressed. It should be noted that if the PF5 key is pressed, the display returns to the previous screen, thus enabling the equivalent amount to be input over again.

(SS32) If the customer presses either the key "1" or "2" and then presses the enter key at Step SS29 or SS31, an input item confirm screen (1) as shown in FIG. 43 appears on the display 11. With this screen, the first 5 input item screens can be designated by pressing the corresponding keys "1" to "5". If the customer presses any of the keys "1" to "5" and then presses the enter key with this screen, the designated input item screen is displayed. It should be noted that if the customer has no foreign remittance card, this step is jumped.

(SS33) If the PF12 key is pressed at Step SS32, input item confirm screens (2) and (3) as shown in FIGS. 44A and 44B, which are similar to the input item confirm screen (1) shown in FIG. 43, appear on the display 11. With these screens, 9 input item screens following the first 5 input item screens can be designated by pressing the corresponding keys "6" to "14". If any of the keys "6" to "14" and the enter key are pressed with these screens, the designated input item screen is displayed.

Figure 45:
FIG. 45 illustrates a card issue screen.

(SS34) If the enter key is pressed at Step SS32 or SS33, a card issue screen as shown in FIG. 45 appears on the display 11. When this screen is displayed, the magnetic card reader/writer 3 records the contents of the input items on one of the magnetic cards stocked therein and issues it as a foreign remittance card 30 from the delivery slot. Thus, the customer can receive the foreign remittance card 30. It should be noted that when the lobby terminal equipment 1 is used with the magnetic card reader/writer 3 disconnected therefrom, this step is jumped.

Figure 46:
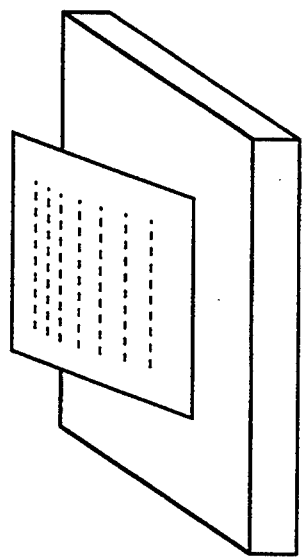
FIG. 46 illustrates an application form print screen.

(SS35) Next, an application form print screen as shown in FIG. 46 appears on the display 11. When this screen is displayed, the printer 2 prints the contents of the input items on an application form for foreign remittance. When the application form is issued after the printing has been completed, the process proceeds to the next step. Thus, the customer can receive the application form. It should be noted that when the lobby terminal equipment 1 is used with the printer 2 disconnected therefrom, this step is jumped.

Figure 47:
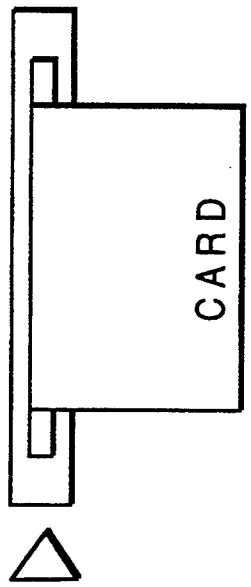
FIG. 47 illustrates a foreign remittance card delivery screen.

(SS36) Next, a foreign remittance card delivery screen as shown in FIG. 47 appears on the display 11. When this screen is displayed, the magnetic card reader/writer 3 records the contents of the input items on the inserted foreign remittance card and returns it from the delivery slot. Thus, the customer can receive the foreign remittance card 30. It should be noted that when the lobby terminal equipment 1 is used with the magnetic card reader/writer 3 disconnected therefrom, this step is jumped.

Figure 48:
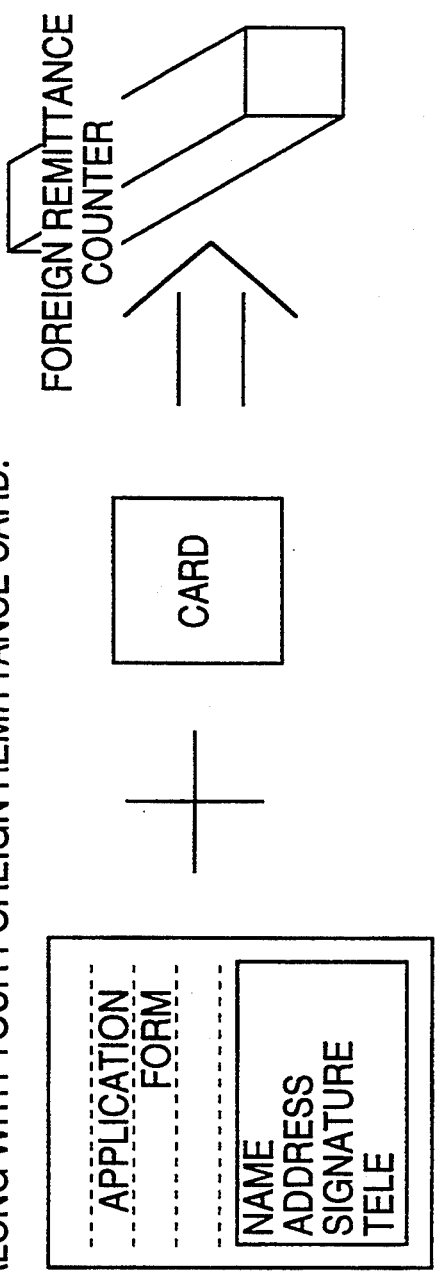
FIG. 48 illustrates an application form entry guide screen.

(SS37) Upon completion of the delivery of the foreign remittance card 30, an application form entry guide screen as shown in FIG. 48 appears on the display 11. This screen prompts the customer to write the sender's signature and so forth on the issued application form, and it is displayed for 10 seconds. It should be noted that when the lobby terminal equipment 1 is used with the printer 2 disconnected therefrom, this step is jumped.

Figure 49:
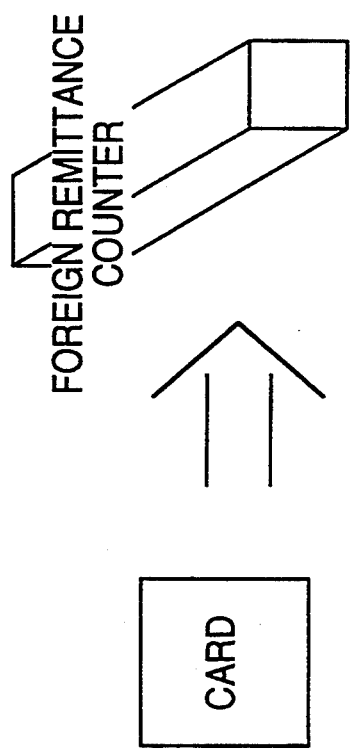
FIG. 49 illustrates a counter guide screen.

(SS38) When the lobby terminal equipment 1 is used with the magnetic card reader/writer 3 connected thereto and with the printer 2 disconnected therefrom, a counter guide screen as shown in FIG. 49 appears on the display 11 after the screen shown in FIG. 48. This screen prompts the customer to take the foreign remittance card to the foreign remittance counter. I should be noted that when the lobby terminal equipment 1 is used with the magnetic card reader/writer 3 disconnected therefrom and with the printer 2 connected thereto, the counter guide screen is not displayed.

(SS39) Finally, a thanks screen as shown in FIG. 50 appears on the display 11.

It should be noted that these operation guidance screens have previously been stored as image data in the files on the hard disk unit 16, and in response to the pressing of a key of the keyboard 12, the CPU 13 reads out the image data for the screen having the screen No. corresponding to the pressed key and displays the read image data on the display 11. In addition, each item of data input from the keyboard 12 is encoded and stored in a predetermined format in the memory 14.

Figure 51:
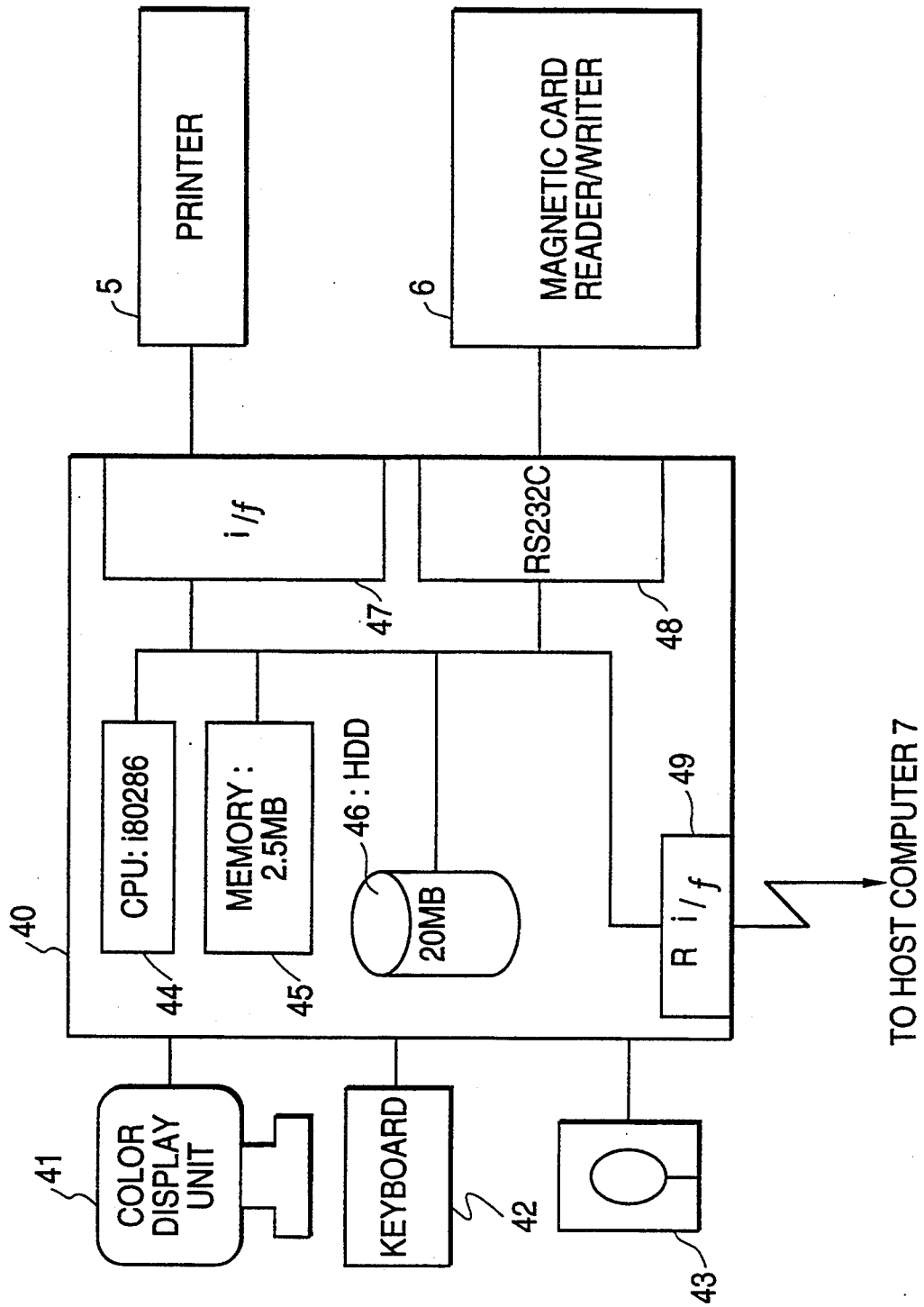
FIG. 51 is a block diagram of counter terminal equipment shown in FIG. 3.
Figure 52:
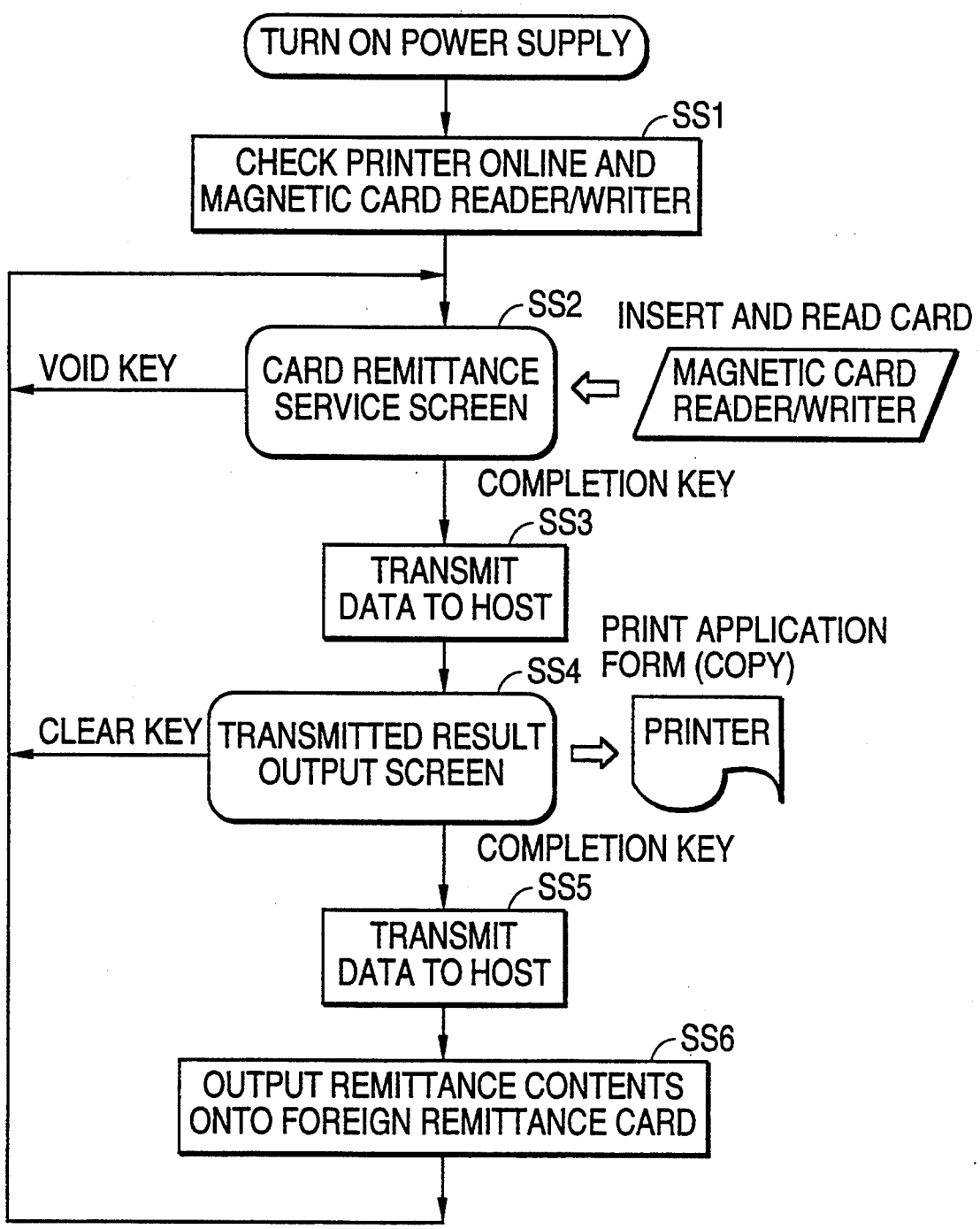
FIG. 52 is a flowchart showing processing executed by the counter terminal equipment shown in FIG. 51.

Next, the counter terminal equipment 4 will be explained. FIG. 51 is a block diagram of the counter terminal equipment 4 shown in FIG. 3. FIG. 52 is a flowchart showing processing executed by the counter terminal equipment 4. FIG. 53 illustrates a card remittance service screen displayed at the counter terminal equipment 4 shown in FIG. 51.

Referring to FIG. 51, a controller 40 comprises a personal computer (FACOM3832C1, manufactured by Fujitsu Ltd)

The controller 40 has a CPU (i80386, manufactured by Intel) 44, a memory 45, a hard disk unit 46, a Centronics interface circuit 47, an RS232C interface circuit 48, and a host interface circuit 49.

The controller 40 is connected with a display unit 41, a keyboard 42, and a floppy disk drive unit 43. In addition, a printer 5 is connected to the Centronics interface circuit 47 of the controller 10. A magnetic card reader/writer 6 having a card hopper is connected to the RS232C interface circuit 48 of the controller 40. Furthermore, the controller 40 is connected to the host computer 7 through the host interface circuit 49.

The operation of the arrangement shown in FIG. 51 will be explained below with reference to the flowchart of FIG. 52.

(SS1) When the power supply for the counter terminal equipment 4 is turned on, the controller 40 checks whether or not the printer 5 is online and the magnetic card reader/writer 6 is connected thereto.

(SS2) When the foreign remittance card 30 is inserted into the magnetic card reader/writer 6 and thus the remittance data is read, a card remittance service screen displaying the contents of the read remittance data appears on the display unit 41. This screen displays the remittance data recorded on the foreign remittance card 30 according to the input items, as shown in FIG. 53. By viewing the screen, the teller confirms that all the items of remittance data have been input. If the void key of the keyboard 42 is pressed, the display is cleared.

(SS3) When the teller approves all the items of remittance data by confirming each item on the above-described screen, he or she presses the completion key of the keyboard 42. Consequently, the controller 40 transmits the remittance data displayed on the screen to the host computer 7 for checking purposes.

(SS4) The host computer 7 checks the remittance data, calculates charges, and transmits the results of these operations to the counter terminal equipment 4, as described later. The counter terminal equipment 4 displays the results sent from the host computer 7 on the screen of the display 41 in the same way as in FIG. 53.

The teller confirms the results of the processing executed by the host computer 7 by viewing the screen. If there is a problem, the teller presses the clear key to cancel the display and returns to Step SS2. If the results of the processing are all right, the teller starts the printer 5 to print an application form (duplicate copy) 51 with the remittance data, together with the results of the processing executed by the host computer 7, thereby issuing the application form (copy) 51.

(SS5) If the above-described results are all right, the teller instructs the controller 40 to transmit the remittance data by the keyboard 42. In response to the instruction, the controller 40 transmits the remittance data to the host computer 7 for remittance processing.

(SS6) Finally, the controller 40 instructs the magnetic card reader/writer 6 to record the contents of the remittance on the foreign remittance card inserted therein and to deliver it. Thus, the remittance processing is completed, and the process returns to Step SS2. The teller hands the customer the application form (copy) 51 and the foreign remittance card 30, thereby completing one remittance transaction.

Figure 55:
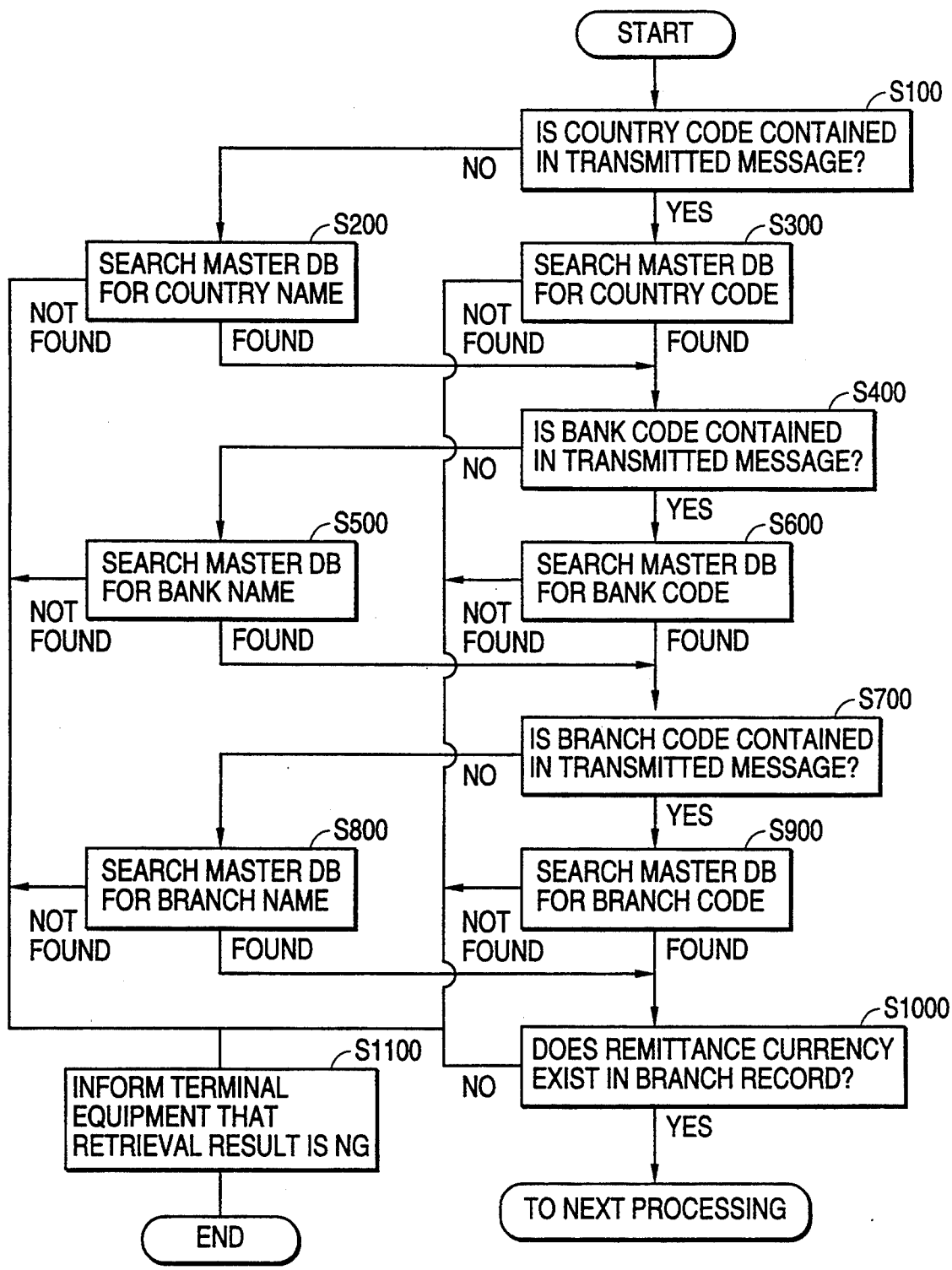
FIG. 55 is a flowchart showing master database retrieval processing executed by the host computer.
Figure 56:
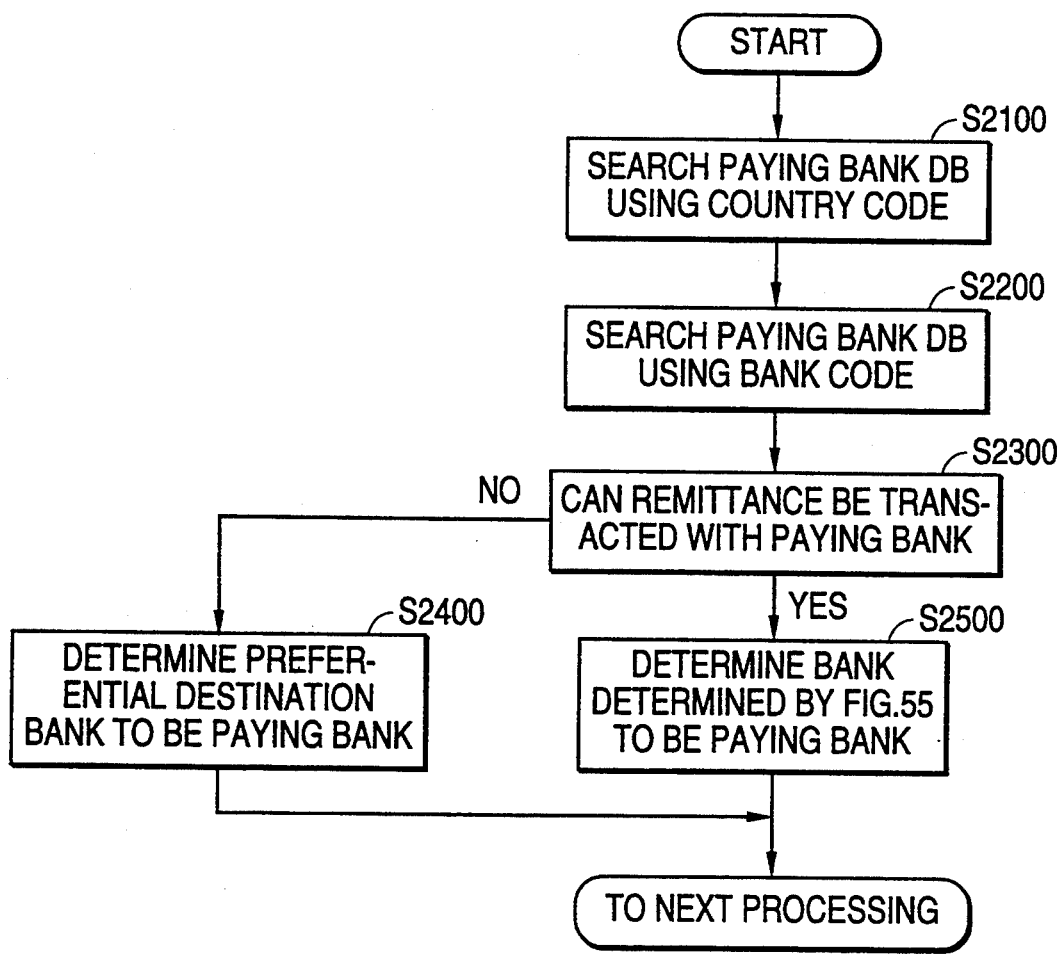
FIG. 56 is a flowchart showing paying bank database retrieval processing executed by the host computer.

Next, the host computer 7 will be explained. FIG. 54 shows the file arrangement of the host computer 7. FIG. 55 is a flowchart showing master database retrieval processing executed by the host computer 7. FIG. 56 is a flowchart showing paying bank database retrieval processing executed by the host computer 7.

As shown in FIG. 54, the host computer 7 has a master database file 71 and a paying bank database file 72. The master database file 71 is used to check the designated beneficiary's country, beneficiary's bank, branch and kind of currency against those which actually exist or are available. The file 71 has previously been stored with the names of existing countries (together with country codes), the names of banks associated with the countries (together with bank codes), the names of branches associated with the banks (together with branch codes), and currencies in circulation. The paying bank database file 72 has previously been stored with bank codes indicating banks with which remittance can be transacted, bank codes indicating banks with which remittance cannot be transacted, and bank codes indicating preferential banks substituting for the banks with which remittance cannot be transacted. The file 72 is used to select the most suitable beneficiary's bank.

The master database retrieval processing will be explained below with reference to FIG. 55.

(S100) The host computer 7 checks whether or not a country (beneficiary's country) code is contained in the message transmitted from the counter terminal equipment 4.

(S200) If it is decided that no country code is available, the computer 7 searches the master database file 71 for the country name in the transmitted message. If the country name in the transmitted message cannot be found, the process proceeds to Step S1100. On the other hand, if the country name in the transmitted message is found, the process proceeds to Step S400.

(S300) If it is decided that a country code is available, the master database file 71 is searched for the country code in the transmitted message. If the country code in the transmitted message cannot be found in the master base file 71, the process proceeds to Step S1100. On the other hand, if the country code in the transmitted message is found in the master base file 71, the process proceeds to Step S400.

(S400) The host computer 7 checks whether not a bank (beneficiary's bank) code is contained in the message transmitted from the counter terminal equipment 4.

(S500) If it is decided that no bank code is available, the computer 7 searches the master database file 71 for the bank name in the transmitted message. If the bank name in the transmitted message cannot be found in the master base file 71, the process proceeds to Step S1100. On the other hand, if the bank name in the transmitted message is found in the master base file 71, the process proceeds to Step S700.

(S600) If it is decided that a bank code is available, the master database file 71 is searched for the bank code in the transmitted message. If the bank code in the transmitted message cannot be found in the master base file 71, the process proceeds to Step S1100. On the other hand, if the bank code in the transmitted message is found in the master base file 71, the process proceeds to Step S700.

(S700) The host computer 7 checks whether or not a branch (beneficiary's branch) code is contained in the message transmitted from the counter terminal equipment 4.

(S800) If it is decided that no branch code is available, the master database file 71 is searched for the branch name in the transmitted message. If the branch name in the transmitted message cannot be found in the master base file 71, the process proceeds to Step S1100. On the other hand, if the branch name in the transmitted message is found in the master base file 71, the process proceeds to Step S1000.

(S900) If it is decided that a branch code is available, the master database file 71 is searched for the branch code in the transmitted message. If the branch code in the transmitted message cannot be found in the master base file 71, the process proceeds to Step S1100. On the other hand, if the branch code in the transmitted message is found in the master base file 71, the process proceeds to Step S1000.

(S1000) The host computer 7 checks whether or not the remittance currency contained in the message transmitted from the counter terminal equipment 4 exists in the record of the branch concerned. If the remittance currency does not exist in the branch record, the process proceeds to Step S1100. On the other hand, if the remittance currency exists in the branch record, the process proceeds to the paying bank database retrieval processing shown in FIG. 56.

(S1100) If the relevant item cannot be found in the file 71 at Step S2, S3, S5, S6, S8, S9 or S10, the computer 7 declares that the application for foreign remittance is incomplete, and informs the counter terminal equipment 4 that the result of the retrieval is NG, thus completing the check.

In this way, the host computer 7 checks whether or not the beneficiary's country, beneficiary's bank, branch and currency written on the application form are correct.

Next, the paying bank database retrieval processing will be explained with reference to FIG. 56.

(S2100) The host computer 7 searches the paying bank database file 72 using the country code in the transmitted message to draw out the bank record.

(S2200) Next, the host computer 7 searches the paying bank database file 72 using the bank code.

(S2300) It is decided from the result of the search whether or not remittance can be transacted with the designated paying bank.

(S2400) If it is decided that remittance cannot be transacted with the designated paying bank, the host computer 7 determines a preferential destination bank registered with the paying bank database file 72 to be a paying bank, and then proceeds to the next step of calculating charges.

(S2500) If it is decided that remittance can be transacted with the designated paying bank, the host computer 7 determines the bank decided in connection with FIG. 21 to be a paying bank, and then proceeds to the step of calculating charges.

Thus, if the designated paying bank is a bank with which remittance cannot be transacted, the paying bank database file 72 is searched for the most suitable bank, and this bank is determined to be a paying bank.

Next, the calculation of charges will be explained. Charges for remittance include basic charges (fixed), predetermined charges for the amount of remittance, and exchange charges according to the kind of currency. Accordingly, the host computer 7 calculates charges for the amount of remittance from the amount of remittance stated in the transmitted message and further calculates exchange charges from the kind of currency designated in the transmitted message. Then, the host computer 7 adds the basic charges to the sum of the charges to thereby calculate charges for remittance. Information on the charges thus calculated and the determined beneficiary's bank is transmitted to the counter terminal equipment 4, as described above. In this way, charges are automatically calculated and imparted to the counter terminal equipment 4. Accordingly, it is possible to minimize the time and labor required for the teller to calculate charges.

The above-described embodiment of the present invention may be modified as follows: Firstly, although in the foregoing embodiment the check of the remittance items, decision of the most suitable bank and calculation of charges are made by the host computer 7, these operations may be performed by the teller as in the past. Secondly, although in the above-described embodiment the foreign remittance card is a magnetic card, it may be other erasable card.

As has been described above, the present invention enables the user to input remittance items according to instructions displayed on operation guidance screens. Accordingly, input of remittance items becomes facilitated and accurate. In addition, since an output medium with the remittance items recorded thereon is obtained as a result of the above-described input operation, it is possible to save the time and labor otherwise required to prepare an application form for foreign remittance separately.

What is claimed is:

1. Foreign remittance transaction terminal apparatus for transmitting foreign remittance data to a host computer for processing foreign remittance, said terminal apparatus comprising:
   lobby terminal equipment operated by a user, said lobby terminal equipment having
   means for said user inputting at least a beneficiary, a remittance currency, and an amount of remittance as items required for application for said foreign remittance,
   means for displaying an operation guidance screen for guidance for said user about items to be input for application for said foreign remittance, and
   means for outputting the items input through said input means onto an output medium and for issuing said output medium to said user; and
   counter terminal equipment operated by a teller and connected to said host computer, said counter terminal equipment having
   means for inputting the contents of said output medium received from said user, and
   means for transmitting said remittance data based on said input contents to said host computer.

2. Foreign remittance transaction terminal apparatus according to claim 1, wherein said lobby terminal equipment further has
   a memory stored with data on a plurality of operation guidance screens described in a plurality of languages, respectively, and
   a controller for drawing out from said memory data on an operation guidance screen described in a language designated through said input means and for displaying said operation guide screen on said display means.

3. Foreign remittance transaction terminal apparatus according to claim 2,
   wherein said medium output means of said lobby terminal equipment is means for printing item data input through said input means on an application form for foreign remittance.

4. Foreign remittance transaction terminal apparatus according to claim 2,
   wherein said medium output means of said lobby terminal equipment is card handling means for recording item data input through said input means on a card and delivering said card, and
   said input means of said counter terminal equipment is card handling means for reading the record contents of said card.

5. Foreign remittance transaction terminal apparatus according to claim 2,
   wherein said medium output means of said lobby terminal equipment is card handling means for recording item data input through said input means on a card and delivering said card and for reading the contents of the card inserted thereinto, and
   said controller of said lobby terminal equipment effects control such that said display means displays an operation guidance screen for inputting remittance data other than the beneficiary data recorded on said card read, and
   wherein said input means of said counter terminal equipment is card handling means for reading the record contents of said card.

6. Foreign remittance transaction terminal appratust according to claim 1,
   wherein said medium output means of said lobby terminal equipment is means for printing item data input through said input means on an application form for foreign remittance.

7. Foreign remittance transaction terminal apparatus according to claim 6,
   wherein said medium output means of said lobby terminal equipment is card handling means for recording item data input through said input means on a card and delivering said card, and
   said input means of said counter terminal equipment is card handling means for reading the record contents of said card.

8. Foreign remittance transaction terminal apparatus according to claim 6, wherein said medium output means of said lobby terminal equipment is card handling means for recording item data input through said input means on a card and delivering said card and for reading the contents of the card inserted thereinto, and said controller of said lobby terminal equipment effects control such that said display means displays an operation guidance screen for inputting remittance data other than the beneficiary data recorded on said card read, and wherein said input means of said counter terminal equipment is card handling means for reading the record contents of said card.

9. Foreign remittance transaction terminal apparatus according to claim 1, wherein said medium output means of said lobby terminal equipment is card handling means for recording item data input through said input means on a card and for delivering said card, and said input means of said counter terminal equipment is card handling means for reading the record contents of said card.

10. Foreign remittance transaction terminal apparatus according to claim 1, wherein said medium output means of said lobby terminal equipment is card handling means for recording item data input through said input means on a card and delivering said card and for reading the contents of the card inserted thereinto, and said input means of said counter terminal equipment is card handling means for reading the record contents of said card, and wherein said lobby terminal equipment further has a controller for displaying on said display means an operation guidance screen for inputting remittance data other than the beneficiary data recorded on said card read.

11. A system for transacting foreign remittance comprising:

lobby terminal equipment operated by a user, said lobby terminal equipment having means for said user inputting at least a beneficiary, a remittance currency, and an amount of remittance as items required for application for said foreign remittance, means for displaying an operation guidance screen for guidance for said user about items to be input for application for said foreign remittance, and means for outputting the items input through said input means onto an output medium and for issuing said output medium to said user;

counter terminal equipment operated by a teller, said counter terminal equipment having means for inputting the contents of said output medium received from said user, display means, and means for transmitting remittance data on the basis of said input contents from the counter terminal equipment; and a computer, connected to said counter terminal equipment and receiving the remittance data from the counter terminal equipment, checking said remittance data and transmitting the result of said check to said counter terminal equipment.

12. Foreign remittance transaction system according to claim 11, wherein said computer further calculates charges required for remittance from said remittance data and transmits the result of said calculation to said counter terminal equipment.

13. Foreign remittance transaction system according to claim 11, wherein said lobby terminal equipment further has a memory stored with data on a plurality of operation guidance screens described in a plurality of languages, respectively, and a controller for drawing out from said memory data on an operation guidance screen described in a language designated through said input means and for displaying said operation guide screen on said display means.

14. Foreign remittance transaction system according to claim 13, wherein said medium output means of said lobby terminal equipment is means for printing item data input through said input means on an application form for foreign remittance.

15. Foreign remittance transaction system according to claim 13, wherein said medium output means of said lobby terminal equipment is card handling means for recording item data input through said input means on a card and delivering said card, and said input means of said counter terminal equipment is card handling means for reading the record contents of said card.

16. Foreign remittance transaction system according to claim 13, wherein said medium output means of said lobby terminal equipment is card handling means for recording item data input through said input means on a card and delivering said card and for reading the contents of the card inserted thereinto, and said controller of said lobby terminal equipment effects control such that said display means displays an operation guidance screen for inputting remittance data other than the beneficiary data recorded on said card read, and wherein said input means of said counter terminal equipment is card handling means for reading the record contents of said card.

17. Foreign remittance transaction system according to claim 11, wherein said medium output means of said lobby terminal equipment is means for printing item data input through said input means on an application form for foreign remittance.

18. Foreign remittance transaction system according to claim 17, wherein said medium output means of said lobby terminal equipment is card handling means for recording item data input through said input means on a card and delivering said card, and said input means of said counter terminal equipment is card handling means for reading the record contents of said card.

19. Foreign remittance transaction terminal equipment according to claim 17, wherein said medium output means of said lobby terminal equipment is card handling means for recording item data input through said input means on a card and delivering said card and for reading the contents of the card inserted thereinto, and said controller of said lobby terminal equipment effects control such that said display means displays an operation guidance screen for inputting remittance data other than the beneficiary data recorded on said card read, and wherein said input means of said counter terminal equipment is card handling means for reading the record contents of said card.

20. Foreign remittance transaction system according to claim 11, wherein said medium output means of said lobby terminal equipment is card handling means for recording item data input through said input means on a card and for delivering said card, and said input means of said counter terminal equipment is card handling means for reading the record contents of said card.

21. Foreign remittance transaction system according to claim 11, wherein said medium output means of said lobby terminal equipment is card handling means for recording item data input through said input means on a card and delivering said card and for reading the contents of the card inserted thereinto, and said input means of said counter terminal equipment is card handling means for reading the record contents of said card, and wherein said lobby terminal equipment further has a controller for displaying on said display means an operation guidance screen for inputting remittance data other than the beneficiary data recorded on said card read.

* * * * *

UNITED STATES PATENT AND TRADEMARK OFFICE
CERTIFICATE OF CORRECTION

PATENT NO. : 5,448,043
DATED : September 5, 1995
INVENTOR(S) : Satoshi NAKANO et al.

It is certified that error appears in the above-indentified patent and that said Letters Patent is hereby corrected as shown below:

Col. 5, line 32, change "51" to --54--.

Col. 7, line 65, after "remittance card" insert --30.--

Col 10  line 36, delete "'-"; and
        line 40 change "19" to --49--.

Col. 11 line 11 change "S2" to --SS2--.

Col. 12, line 40, change "S11" to --SS11--.

UNITED STATES PATENT AND TRADEMARK OFFICE
CERTIFICATE OF CORRECTION

PATENT NO. : 5,448,043
DATED : September 5, 1995
INVENTOR(S) : Satoshi NAKANO et al.

It is certified that error appears in the above-indentified patent and that said Letters Patent is hereby corrected as shown below:

Col. 14, Line 14, change "Currency" to --currency--.
line 41, change "SS29" to --SS28--.

Signed and Sealed this

Twentieth Day of February, 1996

BRUCE LEHMAN

Attest:

Attesting Officer    Commissioner of Patents and Trademarks